(12) United States Patent
Hummelshøj

(10) Patent No.: US 10,503,165 B2
(45) Date of Patent: Dec. 10, 2019

(54) INPUT FROM A PLURALITY OF TELEOPERATORS FOR DECISION MAKING REGARDING A PREDETERMINED DRIVING SITUATION

(71) Applicant: Toyota Research Institute, Inc., Los Altos, CA (US)

(72) Inventor: Jens Strabo Hummelshøj, Burlingame, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 159 days.

(21) Appl. No.: 15/851,890

(22) Filed: Dec. 22, 2017

(65) Prior Publication Data
US 2019/0196465 A1 Jun. 27, 2019

(51) Int. Cl.
| G05D 1/00 | (2006.01) |
| B60W 30/18 | (2012.01) |
| G06K 9/00 | (2006.01) |
| G05D 1/02 | (2006.01) |

(52) U.S. Cl.
CPC ..... *G05D 1/0038* (2013.01); *B60W 30/18009* (2013.01); *G05D 1/0016* (2013.01); *G05D 1/0061* (2013.01); *G05D 1/0088* (2013.01); *G05D 1/0214* (2013.01); *G06K 9/00791* (2013.01); *B60W 2550/14* (2013.01); *B60W 2550/20* (2013.01); *B60W 2550/402* (2013.01); *G05D 2201/0213* (2013.01)

(58) Field of Classification Search
CPC .. G05D 1/0038; G05D 1/0016; G05D 1/0061; G05D 1/0088; G05D 1/0214; G05D 2201/0213; B60W 30/18009; B60W 2550/402; B60W 2550/14; B60W 2550/20; G06K 9/00791
See application file for complete search history.

(56) References Cited

U.S. PATENT DOCUMENTS

| 5,307,271 A | 4/1994 | Everett, Jr. et al. |
| 2015/0362917 A1* | 12/2015 | Wang ................... G05D 1/0022 701/2 |
| 2016/0139594 A1* | 5/2016 | Okumura .............. B60W 30/00 |
| 2017/0123422 A1* | 5/2017 | Kentley ............. B60H 1/00735 |

FOREIGN PATENT DOCUMENTS

| DE | 102012110761 A1 * | 6/2014 |
| WO | 2008060689 A2 | 5/2008 |

* cited by examiner

*Primary Examiner* — Michael J Zanelli
(74) *Attorney, Agent, or Firm* — Christopher G. Darrow; Darrow Mustafa PC

(57) ABSTRACT

A computing system for an autonomous vehicle includes one or more processors for controlling operation of the computing system, and a memory for storing data and program instructions usable by the one or more processors, wherein the one or more processors are configured to execute instructions stored in the memory to: evaluate a first command regime received from a first teleoperator responsive to a predetermined driving situation of the autonomous vehicle; evaluate a second command regime received from a second teleoperator responsive to the predetermined driving situation; responsive to evaluation of the first and second command regimes, select an command regime for implementation by the computing system in response to the predetermined driving situation; and control the autonomous vehicle to implement the selected command regime.

16 Claims, 9 Drawing Sheets

INPUT FROM A PLURALITY OF TELEOPERATORS FOR DECISION MAKING REGARDING A PREDETERMINED DRIVING SITUATION

TECHNICAL FIELD

The present disclosure relates to automated control of vehicles, and, more particularly, to a system and method of providing to an autonomous vehicle teleoperator input relating to operation of the vehicle in any of a plurality of predetermined driving situations.

BACKGROUND

Autonomous vehicles may me configured for self-driving without input from human operators in many driving situations. In certain driving situations, it may be beneficial to have input from remote drivers (or "teleoperators") in resolving a given predetermined driving situation. However, a single driver may not have a high level of experience or skill in dealing with a given driving situation. Also, different drivers may have different levels of experience and skill in dealing with a given driving situation.

SUMMARY OF THE INVENTION

In one aspect of the embodiments described herein, a computing system for an autonomous vehicle is provided. The computing system includes one or more processors for controlling operation of the computing system, and a memory for storing data and program instructions usable by the one or more processors, wherein the one or more processors are configured to execute instructions stored in the memory to: evaluate a first command regime received from a first teleoperator responsive to a predetermined driving situation of the autonomous vehicle; evaluate a second command regime received from a second teleoperator responsive to the predetermined driving situation; responsive to evaluation of the first and second command regimes, select an command regime for implementation by the computing system in response to the predetermined driving situation; and control the autonomous vehicle to implement the selected command regime.

In another aspect of the embodiments described herein, a method of controlling an autonomous vehicle responsive to a predetermined driving situation is provided. The method includes steps of (a) receiving, from each teleoperator of a plurality of teleoperators, an associated teleoperator command regime relating to the predetermined driving situation; (b) evaluating the teleoperator command regime received from each teleoperator of the plurality of teleoperators; (c) responsive to evaluation of the teleoperator command regime received from each teleoperator of the plurality of teleoperators, selecting a command regime for implementation for responding to the predetermined driving situation; (d) controlling the autonomous vehicle so as to implement the selected command regime; and iteratively repeating steps (a)-(d) until the autonomous vehicle is not in the predetermined driving situation.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

In one or more arrangements described herein, a vehicle computing system may receive commands from multiple teleoperators structured as inputs to the vehicle computing system. These inputs may be processed to help determine an optimum command or sequence of commands for executing a particular maneuver or otherwise responding to a particular predetermined driving situation. Thus, the vehicle may not automatically implement commands received from any particular teleoperator (i.e., there is no automatic or direct control of the vehicle by any teleoperator). Rather, the vehicle may constantly evaluate commands received from one or multiple teleoperators as inputs representing possible responses to a driving condition, and determine which commands (if any) to implement in response to the predetermined driving situation. The use of inputs from multiple teleoperators may help to provide an optimum response to the predetermined driving situation, and may help avoid mistakes that may occur using input from a single driver.

Figure 1:
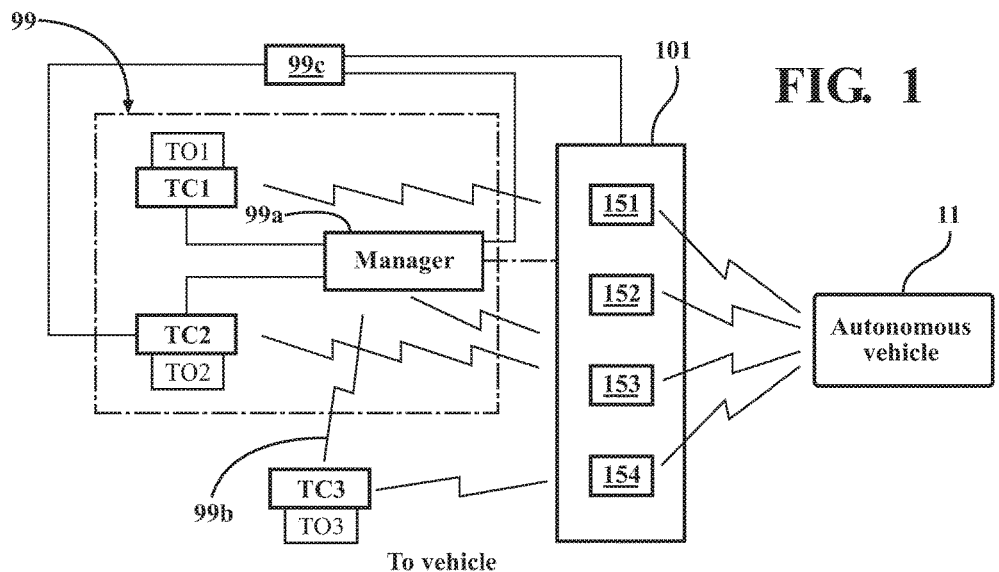
FIG. 1 is a functional block diagram illustrating a vehicle teleoperation input facility in accordance with an example embodiment, in operative communication with a communications network.

FIG. 1 is a functional block diagram illustrating a vehicle teleoperation input facility 99 in accordance with an example embodiment, in operative communication with a communications network 101. In the embodiment shown, vehicle teleoperation input facility 99 includes one or more teleoperation control consoles TC1-TC3 and a teleoperation manager 99a communicatively coupled to the teleoperation control consoles TC1-TC3. The teleoperation control consoles TC1-TC3 may be attended and run by respective teleoperators TO1-TO3 who generate commands to be transmitted to remotely operable vehicles responsive to various predetermined driving situations. The teleoperation manager 99a may be coupled by wire or wirelessly to each of the teleoperation control consoles TC1-TC3. For example, FIG. 1 shows a pair of teleoperation control consoles TC1 and TC2 collocated with teleoperation manager 99a at facility 99 and connected to teleoperation manager 99a by suitable wiring, cabling, or other tangible physical signal transmission means. One or more other, distributed teleoperation control consoles (such as control console TC3) may be positioned at a location different from teleoperation manager 99a and/or consoles TC1 and TC2, and may be coupled to the teleoperation manager 99a using tangible physical signal transmission means such as a hard-wired connection, or wirelessly (as indicated by reference character 99b), using one or more suitable communications network(s). Collocated control consoles TC1 and TC2 may alternatively be wirelessly coupled to the teleoperation manager 99a.

A communications node 99c may reside at facility 99 or may be located offsite. The communications node 99c may be configured to facilitate rapid and uninterrupted communications between the various teleoperation control consoles TC1-TC3, the teleoperation manager 99a, and a communications network 101 (described in greater detail below) which enables operative communication between the teleoperation control consoles TC1-TC3 and an autonomous vehicle 11 requesting teleoperation input for execution of one or more vehicle maneuvers in response to a predetermined driving situation. Communications node 99c may be directly connected to the teleoperation control consoles TC1-TC3, the teleoperation manager 99a, and the communications network 101 by suitable wiring, cabling, or other tangible physical signal transmission means. Alternatively, any of the teleoperation manager 99a and the teleoperation control consoles TC1-TC3 may be wirelessly connected to the communications network 101 using suitable communications interfaces incorporated into the teleoperation manager and control consoles.

Teleoperation manager 99a may be configured to manage overall operations of the teleoperation control consoles TC1-TC3 in operative communication with the teleoperation manager 99a. Teleoperation manager 99a may be configured to establish, manage and/or enable communications between the teleoperation control consoles TC1-TC3 and any autonomous vehicle(s) with which they are in contact. Communications between the teleoperation control consoles TC1-TC3 and one or more autonomous vehicles may be established responsive to a request from an autonomous vehicle for teleoperator input.

Teleoperation manager 99a may also be configured to determine which particular teleoperation control consoles will communicate with a requesting autonomous vehicle, for purposes of inputting commands to the vehicle. Teleoperation manager 99a may be configured to determine which of the teleoperator control consoles in operative communication with the manager 99a will communicate with the next vehicle requesting teleoperator input. Selection of the teleoperator control consoles by the teleoperation manager 99a may depend on such factors as the predetermined driving situation for which teleoperator input is requested, the situational aptitude of the particular teleoperator that will be operating the teleoperation control console when the request for teleoperator input is received, the availability of the teleoperator/teleoperator control console at the time of the request, and any other pertinent factors.

The situational aptitude of a teleoperator may be defined as the aptitude of the teleoperator for safely and efficiently resolving a particular driving situation or performing a particular maneuver. The situational aptitude of the teleoperator may be determined by any suitable method, for example, by tracking teleoperator performance of a maneuver (such as a left turn or traffic merge) over a period of time, and assigning a numerical rating to the teleoperator reflecting the efficiency, safety, etc. with which the teleoperator executes the maneuver. Other methods may also be used for assigning an aptitude value to a teleoperator.

In one or more arrangements, upon receiving a request for teleoperator input for a vehicle maneuver and/or predetermined driving situation, the teleoperator manager 99a may select the available teleoperators having the highest situational aptitudes for the particular type of predetermined driving situation or maneuver for which input is requested. This may help ensure that the highest-quality inputs are provided responsive to the autonomous vehicle to aid in responding to the predetermined driving situation or performing the maneuver. The teleoperator manager 99a may be configured to maintain, on a continuous basis, an updated and prioritized list of teleoperators (in order of descending situational aptitude) to be used for each type of predetermined driving situation for which teleoperator input may be requested. The list may be updated based on availability of the prioritized teleoperators, so that if a first teleoperator choice for a particular situation is unavailable, the teleoperator may proceed down the list until an available teleoperator is found. Similarly, the list may be updated to include a previously unavailable, more highly-rated teleoperator when that teleoperator becomes available.

Figure 2:
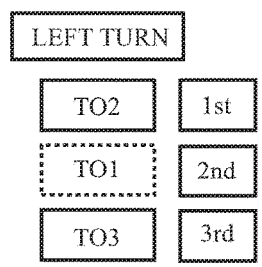
FIG. 2 is a schematic representation of an exemplary list of teleoperators residing on or accessible by a teleoperator manager, showing available and unavailable teleoperator.

For example, referring to FIG. 2, if teleoperator manager 99a receives a request for teleoperator input relating to a left turn, teleoperator manager may refer to a list (shown in FIG. 2) of teleoperators TO1-TO3 designated to provide input relating to left turn requests. The teleoperators TO1-TO3 may be prioritized first (TO2), second (TO1) and third (TO3) in order or preference according to their respective situational aptitudes in resolving left turn situations. If teleoperators TO2 and TO1 are both available, the teleoperator manager may establish or facilitate establishment of communications links between the autonomous vehicle 11 and the teleoperators TO2 and TO1. However, if teleoperator TO1 is unavailable (as indicated by the dashed line in FIG. 2) when the communications link is to be established, the teleoperator manager 99a may establish or facilitate establishment of a communications link between the autonomous vehicle 11 and the next available teleoperator on the priority list (i.e., teleoperator TO3) instead of teleoperator TO1.

Figure 3A:
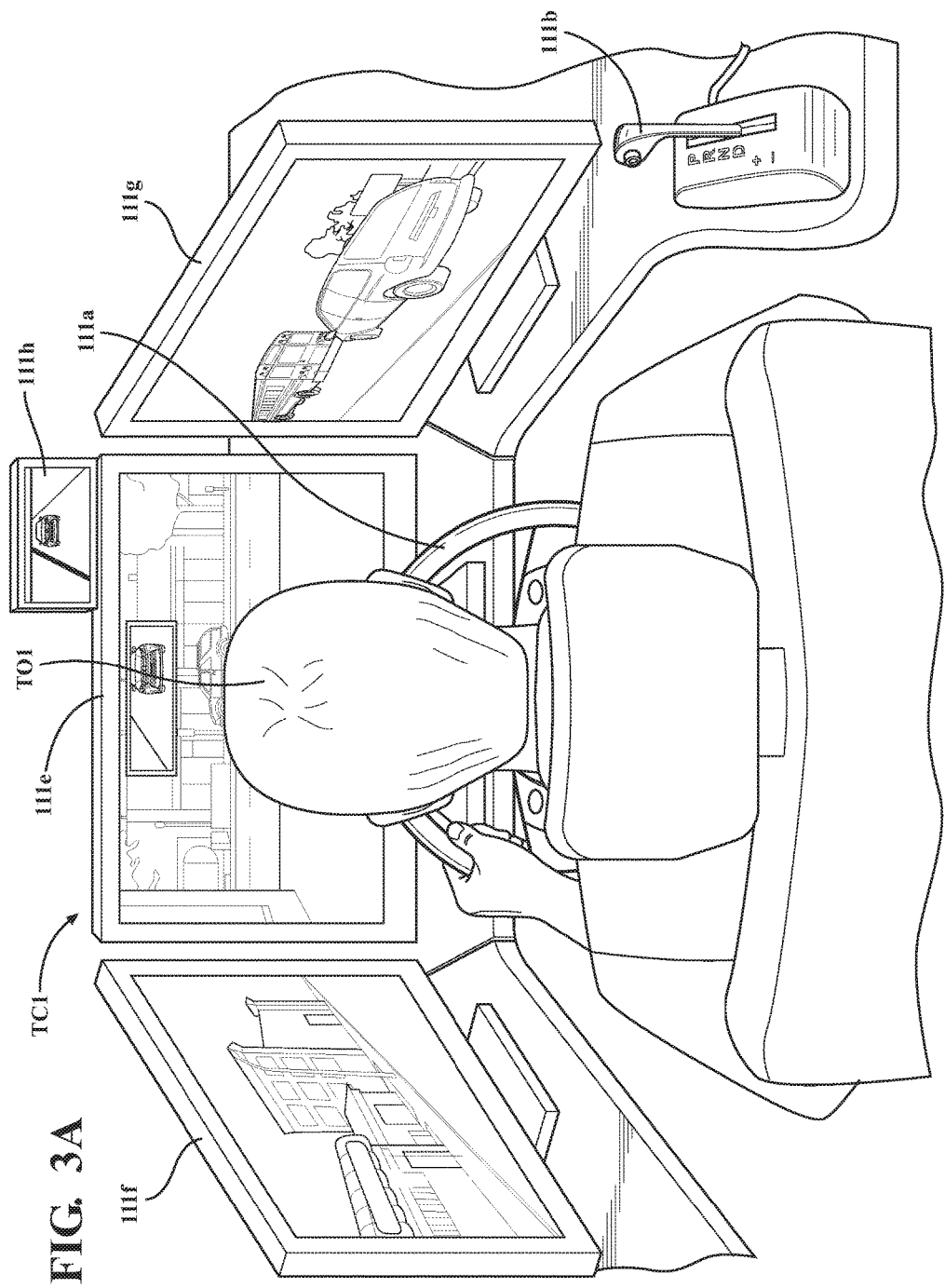
FIG. 3A is a schematic view of a teleoperator control console in accordance with an embodiment described herein.
Figure 3B:
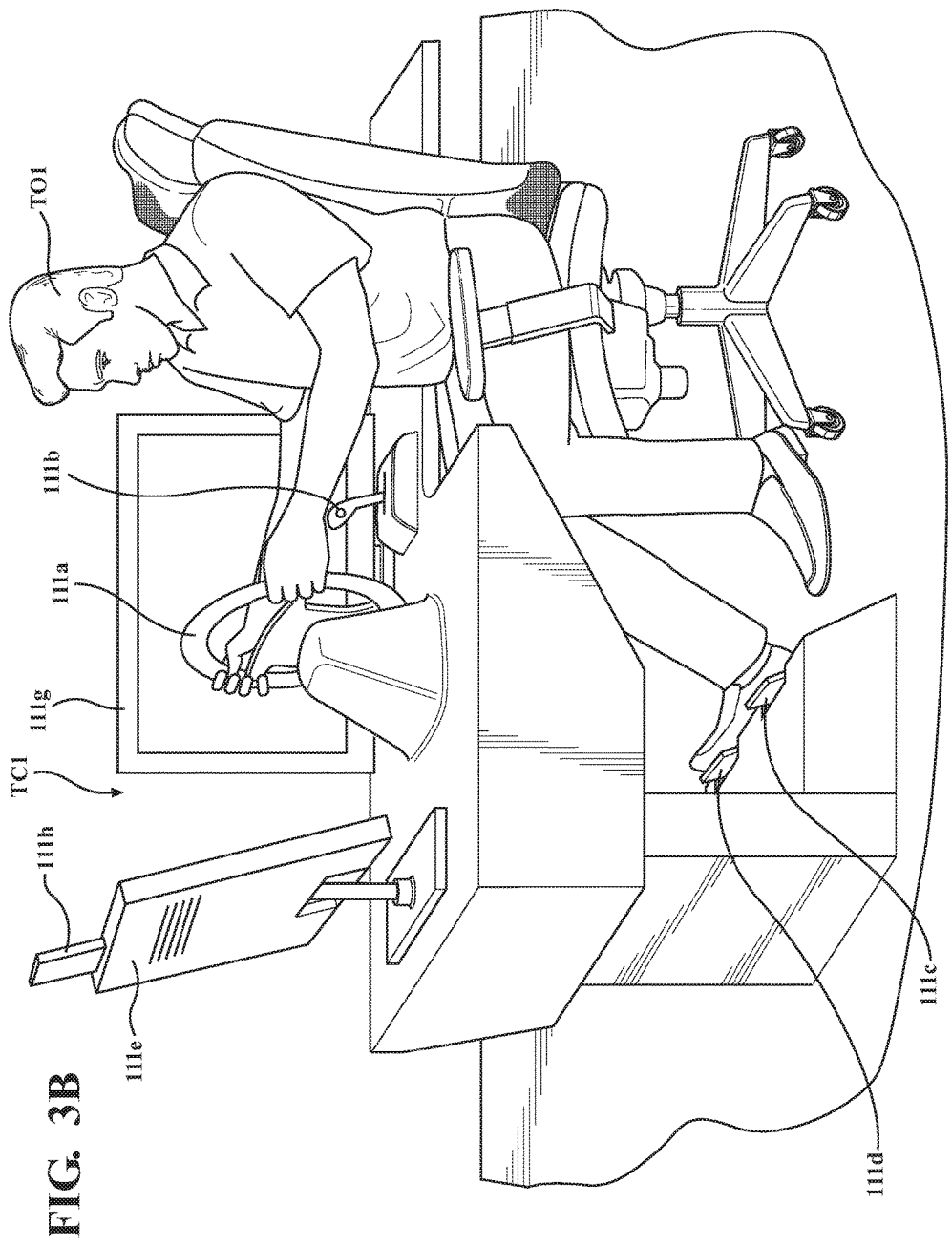
FIG. 3B is a schematic side view of the teleoperator control console of FIG. 3A.

FIGS. 3A-3B show a schematic rear view (FIG. 3A) and side view (FIG. 3B) of one embodiment of a teleoperation control console TC1 suitable for the purposes described herein. As seen in FIGS. 3A-3B, the teleoperation control console TC1 may be configured for operative communication with a vehicle, to receive telemetry from the vehicle and to transmit commands formulated by a teleoperator to the vehicle for evaluation as inputs, for possible implementation as a response to a specific predetermined driving situation. Teleoperation control console TC1 may be configured to simulate a vehicle cockpit or driver seat environment to minimize teleoperator training time and to help minimize the time needed for situational awareness when the teleoperator is responding to a situation encountered by the autonomous vehicle. For example, in the embodiment shown in FIGS. 3A-3B, the control console TC1 includes a steering wheel 111a, a gear shift lever 111b, and accelerator and brake pedals 111c, 111d. The control console TC1 may also include a front display 111e configured to present a view that a driver would see when looking forward from a driver's seat of the autonomous vehicle. In addition, side displays 111f and 111g may be provided, which may be configured to present views of the left side of the vehicle (display 111f) and the right side (111g) of the vehicle 11 that the driver would see when seated in the driver's seat. Also, a rear display 111h may be positioned just above the front display 111e in an approximate position of a vehicle rear view mirror. The rear display 111h may be configured to provide a view to the rear of the vehicle, in the manner of a rear view mirror. The various front and side views may be produced using cameras suitably mounted on the autonomous vehicle. The steering wheel 111a, pedals 111d, 111c, gear shift 111b, and other console controls may be configured to operate in the same manner as in a conventional vehicle, to remotely control aspects of operation of an autonomous vehicle in operative communication with the control console.

In one or more arrangements, a teleoperation control console may incorporate a communications interface configured for enabling communication between the teleoperation control console and an autonomous vehicle via communications network 101. In one or more arrangements, a teleoperation control console may have an indicator (such as a light positioned on the console) (not shown) to indicate to a teleoperator operating the console that commands from that console are currently being implemented by the autonomous vehicle. A teleoperation control console may also have an indicator to indicate to a teleoperator operating the console the status (for example, enabled or disabled) of a communications link between the console and the autonomous vehicle.

Communication network 101 may be configured to provide communication links between vehicle teleoperation input facility 99 and multiple autonomous vehicles (such as autonomous vehicle 11 and other, similar vehicles) simultaneously. For example, communication network 101 may include a number of different types of sub networks 151, 152, 153, and 154, to ensure a certain level of redundancy to facilitate receipt by teleoperation manager 99a of requests for teleoperator input from one or more autonomous vehicles, and to facilitate transmission and receipt of teleoperator input by the one or more autonomous vehicles. For example, the different types of networks in communication network may include different cellular network providers, different types of data networks, etc., to ensure sufficient bandwidth in the event of reduced or lost communications due to outages in one or more sub networks 151, 152, 153, and 154.

Figure 4:
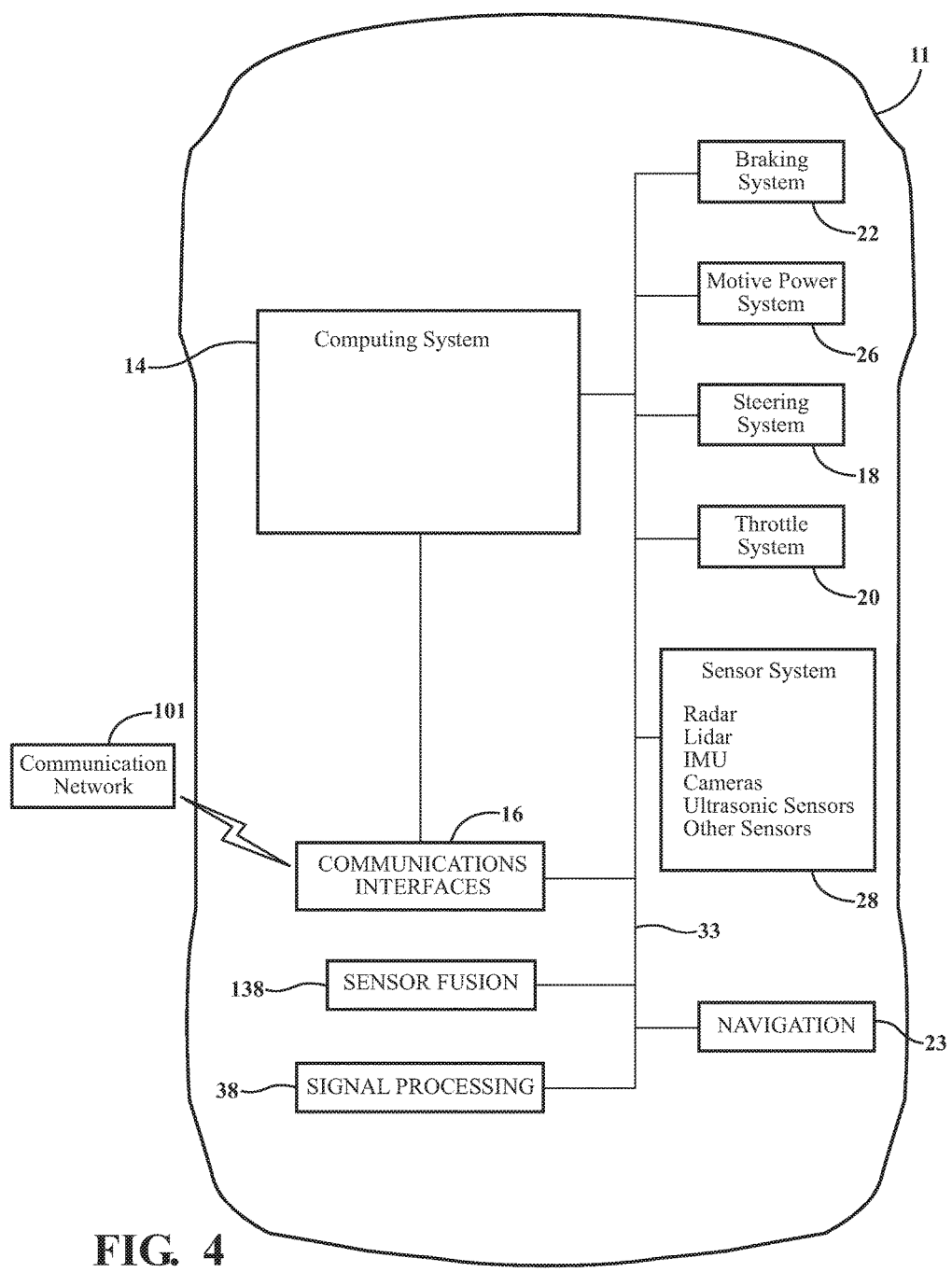
FIG. 4 is a functional block diagram depicting an implementation of an autonomous vehicle that may be communicatively coupled to one or more teleoperator control consoles, in accordance with embodiments described herein.

FIG. 4 is a functional block diagram depicting an implementation of an autonomous vehicle 11 that may be communicatively coupled to one or more teleoperator control consoles, in accordance with embodiments described herein. The vehicle 11 may take the form of a car, truck, or any other vehicle capable of performing the operations described herein. The vehicle 11 may be configured to operate fully or partially in an autonomous mode. While in autonomous mode, the vehicle 11 may be configured to operate without human interaction. For example, in an autonomous mode in which an adaptive cruise control (ACC) system of the vehicle is activated, the vehicle may be controlled to operate the throttle, braking and other systems so as to maintain a safe distance from another vehicle traveling ahead of the vehicle 11, without input from a vehicle occupant. The vehicle 11 may also be configured for completely autonomous driving operations (i.e., for self-driving, without the presence of a driver or driver input) from a start location to a given destination along a route determined by a navigation unit or system 23, for example.

The vehicle 11 may include various systems, subsystems and components in operative communication with each other, such as a sensor system or array 28, a computing system 14, one or more communications interfaces 16, a steering system 18, a throttle system 20, a braking system 22, a motive power system 26, and other systems and components needed for operating the vehicle as described herein. The vehicle 11 may include more or fewer subsystems than those shown in FIG. 4, and each subsystem could include multiple elements. Further, each of the subsystems and elements of vehicle 11 may be interconnected. Performance of one or more of the described functions of the vehicle 11 may be executed by multiple vehicle systems and/or components operating in conjunction with each other.

FIG. 4 also shows a schematic arrangement of primary control sub-systems 18, 20 22, 26 of the vehicle 11 configured to enable full or partial autonomous control of the vehicle 11, for the purposes described herein. The primary control sub-systems may be communicatively coupled to computing system 14, sensor system 28, navigation system 23, and other systems and/or components of the vehicle as needed via a suitable CAN bus 33.

A "primary control sub-system" is a system designed to effect control and operation of one of the primary vehicle controls (i.e., brake, steering, throttle, and motive power), as described herein. Each of primary control sub-systems 18, 20 22, 26 may be configured for fully autonomous operation under the direction of an associated controller (not shown) specialized for the control of the sub-system. For example, a braking system 22 may include a braking system controller (not shown) and various actuatable elements (brakes, etc.) (not shown) necessary for executing braking control commands, and which are configured to be operable responsive to control commands received from the braking controller. Steering system 18 may include a steering system controller (not shown) in operative communication with associated actuatable steering components (not shown) necessary for executing steering control commands. Throttle system 20 may include a throttle controller (not shown) in operative communication with associated actuatable throttle components (not shown) necessary for executing throttle control commands. Motive power system 26 may include a motive power system controller (not shown) in operative communication with associated actuatable motive power components (not shown) necessary for executing motive power control commands. Alternatively, one or more of the primary control sub-systems 18, 20 22, 26 may be configured for control by autonomous computing system 14. Each of the primary control sub-systems 18, 20 22, 26 may also be configured for control by vehicle computing system 14 for purposes of implementing teleoperator commands selected by the computing system for implementation, as described herein. The vehicle embodiment shown in FIG. 4 includes four primary control sub-systems (a steering control system 18, a braking control system 22, a throttle control system 20, and a motive power control system 26). FIG. 4 shows just a few examples of automated vehicle sub-systems 18, 20, 22, 26 which may be incorporated into a vehicle. A particular vehicle may incorporate one or more of these systems or other systems (not shown) in addition to one or more of the systems shown.

The steering system 18 may include such elements as the vehicle wheels, servo-mechanisms, gears, steering knuckles, and/or any other elements or combination of elements (including any computer system-controllable mechanisms or elements) that may be operable to enable autonomous adjustment of the heading of vehicle 11. The motive power system 26 may include components operable to provide powered motion for the vehicle 11. In an example embodiment, the motive power system 26 may include an engine (not shown), an energy source (such as gasoline, diesel fuel, or a one or more electric batteries in the case of a hybrid vehicle), and a transmission (not shown). The braking system 22 may include any combination of elements and/or any computer system-controllable mechanisms configured to decelerate the vehicle 11. The throttle system 20 may include elements and/or mechanisms (for example, an accelerator pedal and/or any computer system-controllable mechanisms configured to control, for instance, the operating speed of the engine and, in turn, control the speed of the vehicle 11.

Examples of specific systems and/or capabilities which may be incorporated into the vehicle 11 to facilitate autonomous vehicle control include adaptive cruise control, electronic stability control, automated lane centering, forward collision warning, lane departure warning, and blind spot monitoring. Additional controls, systems and/or capabilities may be provided if needed to perform the functions described herein, depending on the design of a particular vehicle. Vehicle embodiments described herein are assumed to include sufficient autonomous systems and/or capabilities to autonomously execute all of the commands needed to perform one or more of the vehicle maneuvers or otherwise responds to a predetermined driving situation for which teleoperator input may be requested, as described herein. The vehicle may be capable of autonomously (i.e., without teleoperator or other human input) performing any of the maneuvers In addition, the vehicle may be capable of performing any of the maneuvers further to implementing a command regime input by a teleoperator and selected for implementation by the vehicle computing system. In addition, the vehicle may be capable of performing any of the maneuvers in real time, under the control of the vehicle computing system and responsive to inputs received from one or more teleoperators. The inputs may be provided by one or more teleoperators responsive to a current or real-time predetermined driving situation being experienced by the vehicle. The inputs may be in the nature of commands transmitted to the autonomous vehicle by the teleoperators as proposed responses to the predetermined driving situation.

Figure 5:
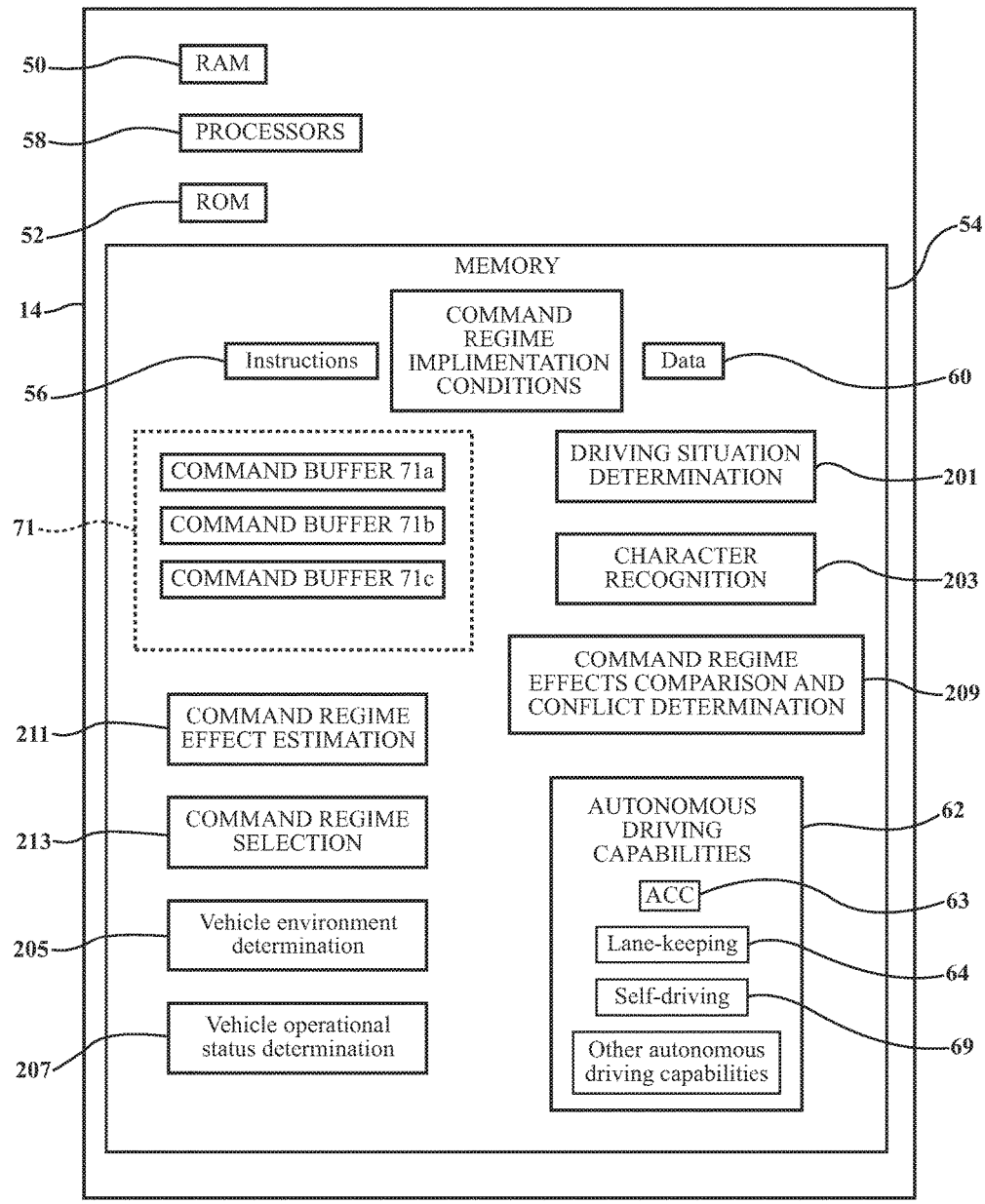
FIG. 5 is a block diagram of an embodiment of an autonomous vehicle computing system that may be used according to one or more illustrative embodiments of the disclosure.

FIG. 5 is a block diagram of an autonomous vehicle computing system 14 that may be used according to one or more illustrative embodiments of the disclosure. The computing system 14 may be operatively connected to the other vehicle systems and elements and otherwise configured so as to affect control and operation of the vehicle 11 and its components as described herein. The computing system 14 may control the functioning of the vehicle 11 based on inputs and/or information received from various subsystems (e.g., motive power system 26, sensor system 28, steering system 18, etc.), from a teleoperation input facility (such as teleoperation input facility 99) via any of the communications interfaces 16, and/or from any other suitable source of information. The computing system 14 may have some or all of the elements shown in FIG. 5. In addition, the computing system 14 may also include additional components as needed or desired for particular applications.

The computing system 14 may include one or more processors 58 for controlling overall operation of the computing system 14 and its associated components, including RAM 50, ROM 52, an input/output module or human-machine interface (HMI) (not shown), computer-readable storage or memory 54, and any other components. Computing system 14 may execute instructions stored in a non-transitory computer readable medium, such as memory 54. "Processor" means any component or group of components that are configured to execute any of the processes and/or process steps described herein or any form of instructions to carry out such processes/process steps or cause such processes/process steps to be performed. The processor(s) 58 may be implemented with one or more general-purpose and/or one or more special-purpose processors. Examples of suitable processors include microprocessors, controllers, microcontrollers, DSP processors, and other circuitry that can execute software. In the context of this document, a computer-readable storage medium may be any tangible medium that can contain or store a program for use by or in connection with an instruction execution system, apparatus, or device. The processor(s) 58 can include at least one hardware circuit (e.g., an integrated circuit) configured to carry out instructions contained in program code. In arrangements in which there is a plurality of processors 58, such processors can work independently from each other or one or more processors can work in combination with each other. In one or more arrangements, the processor(s) 58 can be a main processor of the vehicle 11. The computing system 14, along with any additional computing systems (e.g., any specialized primary sub-system controllers) (not shown) and other devices may correspond to any of multiple systems or devices configured as described herein for functions such as autonomously (i.e., without vehicle operator or occupant input) operating the entire vehicle or specific portions of the vehicle.

Computing system 14 may be configured to act as an autonomous vehicle controller, performing functions such as controlling (or assisting in coordinated control of) all autonomous driving operations, including steering, braking, etc. Computing system 14 may also be configured to operate (and/or coordinate operation of) the various vehicle systems and components so as to execute various autonomous commands or maneuvers, such as lane changes, merges, and left turns, for example. Computing system 14 may also be configured to receive and store information from the sensor array 15 and/or from any other vehicle components pertaining to operation of the vehicle. The computing system 14 may also be configured to receive and store the information so that all of the information is time-correlated and may be processed for diagnostic purposes.

The memory 54 may comprise one or more computer-readable memories. A computer-readable storage or memory 54 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The memory 54 may contain data 60 and/or instructions 56 (e.g., program logic) executable by the processor(s) 58 to execute various functions of the vehicle 11. The memory 54 may contain additional instructions as well, including instructions to transmit data to, receive data from, interact with, or control one or more of the vehicle systems and/or components described herein (for example, motive power system 26, sensor system 28, computing system 14, and the communication interfaces 16). In addition to the instructions 56, the memory 54 may store data such as roadway maps, path information, among other information. Such information may be used by the vehicle 11 and the computer system 14 for route planning and otherwise during the operation of the vehicle 11 in autonomous, semi-autonomous, and/or manual modes.

The computing system 14 may be configured to coordinate control of the various actuatable vehicle systems and components so as to implement one or more autonomous capabilities (generally designated 62), including vehicle control capabilities such as a self-driving capability 69 and/or various autonomous driving assistance capabilities. These autonomous capabilities 62 may be stored in memory 54 and/or in other memories and implemented in the form of computer-readable program code that, when executed by a processor, implement one or more of the various processes, instructions or functions described herein. Any of the various capabilities described herein may be embodied in software, suitable hardware, and/or a combination of both hardware and software. A driving assistance capability may be defined as a capability which assists a driver in operating the vehicle by performing one or more functions which may be performed by the driver if the capability is absent or deactivated. Examples of driving assistance capabilities include adaptive cruise control (ACC) 63 and lane-keeping 64. A self-driving capability may be defined as an ability of the vehicle to perform all of the driving operations required to autonomously (i.e., without human input or interaction) drive the vehicle from a first or start location to a predetermined destination. The various autonomous driving assistance capabilities described herein may be part of the self-driving capability 69, or the various autonomous driving assistance capabilities described herein may be activated or utilized by the self-driving capability 69 to control the vehicle to drive the vehicle from a first or start location to the predetermined destination.

An adaptive cruise control capability (ACC) 63 may be defined as a cruise control system that automatically adjusts the vehicle speed to maintain a safe distance from vehicles ahead, based in information from onboard vehicle sensors. Thus, responsive to inputs from the vehicle sensors, for example, the computing system 14 may control the throttle system, braking system, motive power system and any other pertinent systems as required to implement the ACC functions. An autonomous lane keeping capability 64 may be defined as a system designed to monitor a relative position of the vehicle with respect to the boundaries of a traffic lane in which the vehicle is traveling, and to control the throttle system, steering system, any other pertinent systems as required to maintain the vehicle 11 in the current lane. The lane boundaries may be detected by vehicle sensors or by any other suitable method. In addition, elements of the autonomous lane keeping capability 64 and various sensors usable for the lane keeping function may be usable in detecting or determining a target lane into which a vehicle is to be autonomously steered pursuant to a lane change or traffic merging operation, as described herein.

The computing system 14 may be configured to autonomously operate the vehicle 11 so as to drive the vehicle from a start location to a destination or end location located remotely from the start location, using self-driving capability 69. U.S. application Ser. No. 14/789,004, the disclosure of which is incorporated herein by reference in its entirety, describes methods and systems usable for controlling an autonomously operable vehicle while traveling from a start location to a designated end location. An autonomous vehicle configured as described in the '004 application may be operable (in conjunction with the navigation unit or system 23) to drive the vehicle along a designated route between the start and end locations. The computing system 14 may be configured to (responsive to inputs to the navigation system from sensors 28, such as cameras) operate the vehicle 11 in accordance with traffic lights and traffic signs along the planned route and to perform any other operations and functions necessary for self-driving the vehicle between the start and end locations. In one or more arrangements, the computing system 14 described herein can incorporate artificial or computational intelligence elements, e.g., neural network, or other machine learning algorithms. Further, in one or more arrangements, the hardware and/or software elements configured for performing particular functions or operations described herein may be distributed among a plurality of elements and/or locations. In addition to computing system 14, the vehicle may incorporate additional computing systems and/or devices (not shown) to augment or support the control functions performed by computing system 14, or for other purposes.

Information from sensors and other sources in the vehicle and exterior to the vehicle may be processed and used to control various vehicle systems and components. For example, various road condition sensors may be provided to supply information to the computing system 14 to enable the computing system to process the road condition information in accordance with stored processor-executable instructions and teleoperator command evaluation procedures, and to formulate appropriate control commands to the steering, throttle, and braking systems. The computing system 14 may continuously receive and process an ongoing or continuous flow of information from sensor system 28 and from other information sources. This information may be processed and/or evaluated in accordance with instructions stored in a memory, in a manner and for the purposes described herein. The use of "continuously" when referring to the reception, gathering, monitoring, processing, and/or determination of any data, information or other parameters described herein means that the computing system 14 is configured to receive and/or process any information relating to these parameters as soon as the information exists or is detected, or as soon as possible in accordance with sensor acquisition and processor processing cycles.

In one or more arrangements, embodiments of the vehicle computing system described herein are configured to determine commands usable for controlling the vehicle so as to initiate a response to a predetermined driving situation as soon as possible, in accordance with conditions found to be indicative of safe and effective execution of the proposed response. Although the various aspects of the systems and methods of the present invention will be described using the example of a left turn maneuver to be performed by the autonomous vehicle, it will be understood that the principles set forth herein may be adapted and applied to other vehicle situations and maneuvers as desired. For example, the vehicle control system may be configured to determine commands to be used to control the autonomous vehicle in the performance of a lane change, a traffic merge, or any of a variety of other vehicle maneuvers or in response to any of a variety of predetermined driving situations.

The vehicle computing system 14 may be configured to request input from one or more teleoperators in situations where, for example, the vehicle is unable to perform a maneuver or formulate a response to the predetermined driving situation for some reason, and needs control input from a teleoperator to help respond to the driving situation. Commands received from the teleoperators may be directed to executing at least a portion of a vehicle maneuver in response to the predetermined driving situation of the autonomous vehicle. The computing system may then request commands from two or more teleoperators for analysis and comparison, to try to find a best response to the predetermined driving situation, while helping to promote maximum safety and efficiency. In another example, the vehicle computing system 14 may also be configured to request input from one or more teleoperators in situations where specified vehicle maneuvers are called for and the vehicle should be capable of performing the maneuver. In such a case, commands received from the teleoperator(s) may be used for comparison with a proposed command or set of commands generated by the autonomous vehicle computing system, to determine if the teleoperator commands may provide superior performance of the maneuver. In addition, commands and command regimes received from teleoperators over time may be correlated with information related to the commands and command regimes, such as characteristics of the predetermined driving situations addressed, associated vehicle environment information, and other associated data and information. This correlated information and pertinent raw data may be stored in a memory for later analysis. Because it form a record of human driver inputs in response to real-world situations which may be encountered by the autonomous vehicle, such information may be useful in revising and improving autonomous vehicle control algorithms and machine learning models usable for training autonomous vehicles.

Referring to FIG. 5, the autonomous vehicle may incorporate one or more teleoperator command buffers 71 may be configured to receive and store commands transmitted by the teleoperator control consoles TC1-TC3 to the autonomous vehicle 11. The embodiment of FIG. 5 shows three command buffers 71*a*-71*c*, each configured to receive a stream of commands from an associated teleoperator. The autonomous vehicle 11 may include any desired number of command buffers usable for the purposes described herein. Each of buffer(s) 71*a*-71*c* may provide a dedicated memory or portion of a memory for an associated one of the teleoperator control consoles TC1-TC3. This dedicated memory may receive and store commands received from a particular control console for subsequent evaluation of the commands by the computing system 14 so that the commands and changes to the commands may be evaluated in the order received, in as close as possible to real time.

The command buffers 71*a*-71*c* may also be configured to facilitate simultaneous receipt and evaluation of multiple commands from any given teleoperator. For example, contemporaneous, interrelated steering and throttle commands received for the purpose of executing a left turn maneuver may be received and stored for processing as a single command regime. The buffers 71*a*-71*c* may also be configured to facilitate simultaneous implementation of multiple commands and/or sub-commands selected from the received commands for implementation. Implementation of a command or command regime refers to implementation or execution of the commands so as to operate and control the vehicle.

In one or more arrangements, a teleoperator command may comprise a control setting on a teleoperator control console that would affect one of the primary autonomous vehicle systems (i.e., steering, throttle, braking, and motive power) if implemented by the autonomous vehicle. For example, the steering wheel angle, throttle level, and other control parameters may constantly be measured at the control console by suitable sensors and transmitted as control command inputs to the autonomous vehicle. A command regime from a given teleoperator (i.e., a "teleoperator command regime") may comprise the totality of all commands currently in effect due to operation of an associated control console by the teleoperator. The command regime may change when one or more commands change. For example, in a first command regime reflecting commands sent to the autonomous vehicle by a first teleoperator, the autonomous vehicle speedometer may read a value of "x", the vehicle steering wheel angle may be "y", and the brakes may be "off" (i.e., not currently applied because the vehicle is moving). If a throttle level is modified by the teleoperator so that the speedometer reads "x+x'" and/or if the steering wheel angle is changed, the command regime has changed. Also, the command regime may comprise a single command or multiple commands.

Embodiments of the autonomous vehicle computing system described herein may incorporate (or may have access to) a driving situation determination capability 201 configured to detect and/or determine when the vehicle 11 is in or approaching any one of several predetermined driving situations (for example, a left turn situation or a traffic merge situation) for which it is deemed advisable for the vehicle computing system 14 to request teleoperator input. The driving situation determination capability 201 may be configured to determine when the vehicle 11 is currently in the predetermined driving situation, for example, due to unanticipated circumstances. Driving situation determination capability 201 may also be configured to determine (with as much advance notice as possible) when the vehicle is approaching or will encounter any of the several predetermined situations for which the vehicle may request teleoperator input. The driving situation determination capability 201 may also be configured to determine when the vehicle will encounter the situation for which the vehicle may request teleoperator input. The ability to determine or detect (with as much notice as possible) a situation where the vehicle 11 is approaching or will encounter a situation for which the vehicle may request teleoperator input enables communication links between the autonomous vehicle 11 and teleoperator control consoles TC1-TC3 to be established prior to the actual need for teleoperator input. This may facilitate resolution of possible wireless or other communications issues, and is also directed to allowing sufficient time for the teleoperators to acquire situational awareness. For example, situations such as a left turn or a traffic merge may be determined ahead of time by reference to a planned route formulated by a navigation system. In other cases, a sudden or unexpected need for teleoperator input may arise, in which case the autonomous vehicle computing system 14 may determine the need and establish communication with the teleoperation facility as soon as possible.

In one or more arrangements, a record of predetermined driving situations for which it is deemed advisable or desirable to request teleoperator input may be stored in a memory of the computing system or in a memory accessible to the computing system. The record of predetermined driving situations may include parameters, circumstances, and/or other situation recognition factors detectable by the vehicle sensors and/or other means, which may be used to help define each driving situation and to aid the autonomous vehicle in identifying each driving situation as soon as possible. For example, a requirement for the vehicle to make a left turn at a location three miles from its current location along a planned route of the vehicle may be determined from the vehicle navigation system. This determination may enable suitable communications links to be established between the autonomous vehicle and the teleoperators prior to reaching the location of the left turn.

In another example, a road sign indicating the need for a left turn (or implicating the need for a lane change) may be unexpectedly encountered by the vehicle 11. The vehicle sensors 28 and computing system 14 may be configured to detect and interpret such a sign (for example, using the character recognition capability described herein). The computing system 14 may then initiate communications with teleoperators TO1-TO3 for the purpose of performing the required vehicle maneuver.

Various characteristics of a planned route may be available to the vehicle computing system 14 through the navigation system 23. Alternatively, the vehicle 11 may be equipped with a vision system and character-recognition capability 203 configured for reading road signs and extracting therefrom information which may relate to features or situations for which teleoperator input may be requested. The requirement for lane changes, left turns, traffic merges, and other predetermined driving situations may be determined in this manner. This may enable the vehicle computing system 14 to request teleoperator input in advance of an actual need, so that communication links may be established between the autonomous vehicle and one or more teleoperators. In one particular example, such a system may be configured to detect and interpret overhead road direction and exit signs and to use this information in determining the distance to an exit and the side of the road on which the exit resides. This may provide information relating to upcoming lane changes. The character-recognition capability may also be utilized by the vehicle environment determination capability 205 (described herein) to aid in determining features of the vehicle environment.

The vehicle computing system 14 may incorporate a vehicle operational status determination capability 207. The computing system 14 (through the vehicle operational status determination capability 207) may be configured to constantly determine an operational status of the autonomous vehicle. The operational status of the vehicle 11 may relate to the status or operating condition of any vehicle systems or components which may affect the ability of the vehicle to perform a maneuver or execute a response to a predetermined driving situation for which teleoperator input may be requested. For example, tire pressure and the condition of the engine may affect the vehicle's capability to accelerate from a stationary condition. In another example, the condition of the vehicle brakes and/or tires may affect the distance required to bring the vehicle to a stop from a given speed. Vehicle operational status parameters such as these which may affect performance of a maneuver by the vehicle 11 may be monitored by vehicle sensors 28 and/or any other suitable means, and the data relating to the parameters may be forwarded to the vehicle computing system 14 to aid in evaluating commands received from the teleoperators TO1-TO3, and in estimating the effects of implementing the received teleoperator commands. In one or more arrangements, data on many of the operational status parameters may collected on a constant basis by sensors designed to gather such data for other purposes. Thus, such data may also be used by the computing system 14 for evaluation, selection, and/or implementation of teleoperator and vehicle-generated commands.

The vehicle computing system 14 may incorporate a vehicle environment determination capability 205. The vehicle computing system (through the vehicle environment determination capability 205) may be configured to continuously determine and/or estimate factors representing the status of the vehicle environment, using vehicle sensor data, sensor data received from other vehicles, received weather data, and/or pertinent information from any other available source. Aspects of the vehicle environment may include factors external to the vehicle 11 which may affect performance of a maneuver by the vehicle. Representative examples of such environmental factors are aspects of road conditions, the positions, speeds, and directions of other vehicles relative to the autonomous vehicle 11; the estimated paths of the other vehicles; the position of the autonomous vehicle 11 with respect to traffic lane markers and roadside markers; the status (red, green, yellow) of pertinent traffic lights; the location of the vehicle 11 with respect to intersections and road exits (which may be determined using a navigation system in operative communication with the computing system), and numerous other factors. The vehicle computing system may also be configured to estimate or calculate the paths of other vehicles approaching, moving away from, and/or otherwise traveling near the autonomous vehicle, using autonomous vehicle sensor data, information received from the other vehicle, and/or from any other suitable source.

The computing system 14 may also be configured to continuously process or evaluate teleoperator commands in a manner described herein, to determine which commands (if any) from which teleoperator are suitable for implementation by the vehicle computing system to control the autonomous vehicle 11. Processor(s) 58 may include one or more processors configured to perform the command evaluation functions described herein. In one or more arrangements, to accelerate the processing of teleoperator commands by the vehicle computing system 14, a separate, dedicated command processor may be provided for processing commands received from each one of multiple teleoperators in operative communication with vehicle 11. Each dedicated command processor may be configured to perform the command processing functions described herein. This enables command regimes from multiple teleoperators to be evaluated in parallel or simultaneously.

In one or more arrangements, evaluation of commands and/or command regimes received from the teleoperators TO1-TO3 may include estimating the effects of implementing a command and/or commands regime received from a teleoperator; comparing the estimated effects of implementing the commands and/or command regime with certain indicators or conditions found to be indicative of successful execution of a maneuver, and therefore deemed desirable for implementation of a command regime; and determining, based on the comparison, if implementation of the command and/or command regime would conflict with any of the conditions deemed desirable for implementation (i.e., the "implementation conditions").

The computing system may incorporate a command regime effect estimation capability 211. Implementation of each command regime and each change to a command regime will have an estimated effect on operation of the autonomous vehicle 11, affecting such factors as the speed and acceleration of the autonomous vehicle 11, the position of the autonomous vehicle 11 with respect to other vehicles, and the position of the autonomous vehicle 11 with respect to traffic lane markers, for example. Vehicle computing system 14 may be configured to determine or estimate the effects on the autonomous vehicle 11 of implementing a command and/or command regime. In estimating these effects of implementing these commands, the computing system may take into account the autonomous vehicle operational status information and the vehicle environment information previously described. The computing system may also take into account other pertinent factors. For example, the vehicle computing system 14 may be configured to determine or estimate changes in various parameters as the command regime is implemented, such as the speed of the autonomous vehicle 11 over time, the position of the autonomous vehicle 11 over time with respect to other vehicles, an estimated travel path of the autonomous vehicle 11, and the position of the autonomous vehicle 11 with respect to traffic lane markers, for example.

In one particular example, using such parameters as the speeds, velocities, accelerations, and directions of the autonomous vehicle 11 and other vehicles traveling within sensor range of the autonomous vehicle 11, detected road conditions, and aspects of the autonomous vehicle mechanical condition, the vehicle computing system 14 may be configured to determine or estimate (using the command regime effect estimation capability 211) the probability of a situation where, for example, the autonomous vehicle 11 may collide with (or approach to within a distance less than a predetermined distance from) another vehicle as a result of implementing a command or command regime.

Figure 6:
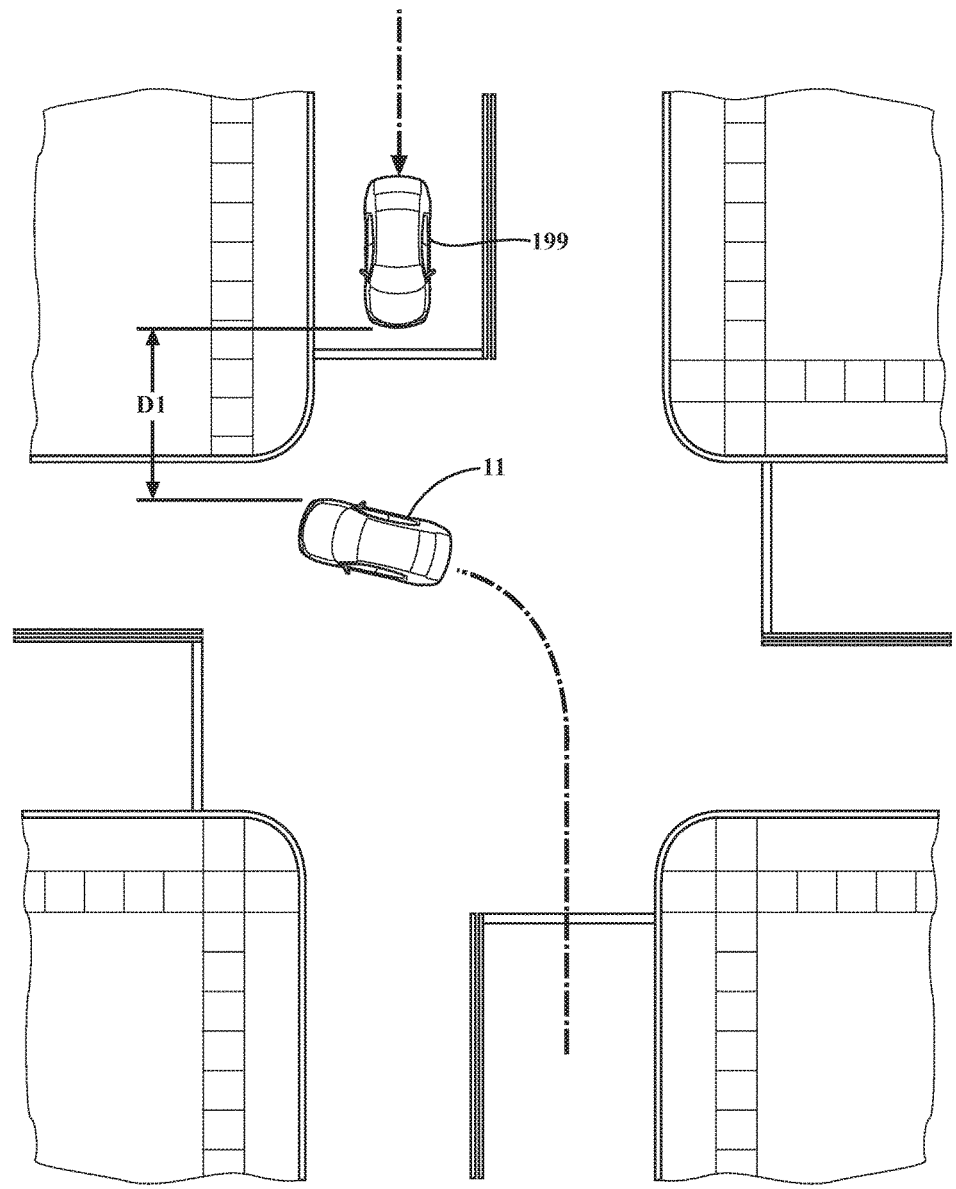
FIG. 6 is a schematic plan view of a road intersection illustrating an example of a command regime implementation condition in accordance with an embodiment described herein.

Referring to FIG. 6, in another example, as a command regime implementation condition precedent to proceeding with a left turn from a stationary condition, the autonomous vehicle 11 may need to complete the turn while ensuring that a detected oncoming vehicle 199 will not approach to within less than a predetermined distance D1 of the autonomous vehicle 11 during the turn. If the degree of a throttle command inputted by a teleoperator is excessive for detected road conditions, implementation of the throttle command may cause slippage of the autonomous vehicle tires such that traction between the autonomous vehicle 11 and the road would be delayed, thereby delaying movement of the autonomous vehicle 11 after the throttle command is received. This may delay the turn such that satisfaction of the vehicle proximity condition is prevented. This effect of the throttle command of the command regime may be estimated by the command regime effect estimation capability 211.

The autonomous vehicle computing system 14 may incorporate a command regime effects comparison and conflict determination capability 209. The computing system may be configured to, using the command regime effects comparison and conflict determination capability 209, compare the estimated effects of implementing a proposed command or command regime to one or more implementation conditions which need to be satisfied in order for the command or command regime to be implemented. Using the results of the comparisons, the computing system may determine if any conflicts exist between the estimated effects and the implementation conditions.

The implementation conditions used for comparison may be stored in a memory of (or accessible by) the computing system. In one or more arrangements, the conditions may be based on statistical analyses of data compiled by vehicle systems over performance of a large number of actual vehicle maneuvers, or from traffic accident data compiled over a period of time. The data may be analyzed to determine conditions and situations favorable to the safe and efficient performance of a maneuver. Statistics may be compiled for any of a variety of parameters relating to a particular vehicle maneuver. In one example, available statistics relating to left turns may indicate that, if an oncoming vehicle has been detected by the autonomous vehicle sensors and the speed of the oncoming vehicle is not decreasing as it approaches the intersection, that it is preferable to make the turn after the oncoming vehicle has either stopped or passed the autonomous vehicle. Thus, a condition may be formulated and stored in memory indicating that the autonomous vehicle should only start turning if no such other vehicle is detected. If this condition is in effect, and implementation of a command regime would involve turning so as to cross a lane in which such an oncoming vehicle is approaching, the vehicle computing system 14 may (when performing a command regime selection procedure as described below) omit this command regime as a candidate for command regime implementation on this basis.

In another example, available statistics relating to left turns may indicate that it is preferable to turn from a left-most turn lane into a left-most traffic lane of a road onto which the autonomous vehicle is turning. Thus, a condition may be formulated and stored in memory indicating that an autonomous vehicle turning from a left-most left turn lane should only turn into a left-most lane of an intersecting road onto which the vehicle is turning. If this condition is implemented, and implementation of a command regime would involve turning the vehicle into another lane (for example, a lane just to the right of the left-most lane), the vehicle computing system may omit this command regime as a candidate for implementation on this basis.

In another example, available statistics relating to left turns may indicate that it is preferable to activate a turn signal as soon as possible and before entering a left turn lane, to give drivers in surrounding vehicles as much notice as possible of the autonomous vehicle intentions. If this condition is implemented, the vehicle computing system may activate the turn signal as soon as any teleoperator activates the signal as an associated control console. In this case the turn signal would be activated as early as possible.

Referring to FIG. 6, in another example, available statistics relating to left turns may indicate that, where a oncoming vehicle in an adjacent lane is detected (such as vehicle 199 in FIG. 6, for example), it is preferable for the autonomous vehicle 11 to complete the turn and be out of the adjacent traffic lane before any oncoming vehicle traveling at a predetermined maximum speed can approach within a distance less than a predetermined distance D1 from the autonomous vehicle. If this condition is implemented, and implementation of a command regime would involve making a turn that would not be completed before the oncoming vehicle 199 approached the autonomous vehicle 11 within a distance less than a predetermined distance from the autonomous vehicle, the vehicle computing system may omit this command regime as a candidate for implementation on this basis.

In yet another example, and as previously described, available statistics relating to left turns may indicate that, if an oncoming vehicle has been detected by the autonomous vehicle sensors and the speed of the oncoming vehicle is not decreasing as it approaches the intersection, that it is preferable to make the turn after the oncoming vehicle has either stopped or passed the autonomous vehicle in the adjacent lane. If this condition is implemented, and implementation of a command regime would involve making a turn that would cross in front of an oncoming vehicle whose speed is not decreasing as it approaches the intersection, the autonomous vehicle computing system may omit this command regime as a candidate for implementation on this basis. In addition, statistics may be compiled and command implementation conditions formulated for any of a variety of other parameters relating to a particular vehicle maneuver. In one or more arrangements, various comparison conditions may be based on safety considerations, such as detected road conditions and a minimum desirable spacing between the autonomous vehicle and other vehicles during a maneuver.

In some cases, the estimated effects of implementation of a command regime are relevant to satisfaction of a particular condition, and the proposed commands and the proposed circumstances of their implementation are estimated to be such that implementation of the commands will satisfy the condition. These effects would then be deemed to not interfere with satisfaction of the condition. In some other cases, the effects of command implementation may have no effect on satisfaction of a condition (i.e., the comparison of the estimated effects of command implementation to a particular condition may indicate that the estimated effects will not interfere with satisfaction of the condition). For example, some conditions may relate to the presence and/or movements of vehicles other than the autonomous vehicle 11. If no other vehicles are detected prior to or during the comparison of the estimated effects to the conditions, then this condition may not be impacted by implementation of the proposed command regime.

However, in some cases, the comparison of the estimated effects of command implementation to a particular condition may indicate that the estimated effects will interfere with or prevent satisfaction of the condition. For example, as previously described, as a vehicle proximity condition precedent to proceeding with a left turn from a stationary condition, the autonomous vehicle may need to complete the turn while ensuring that a detected oncoming vehicle will not approach to within less than a predetermined distance of the autonomous vehicle during the turn. If the degree of a throttle command inputted by a teleoperator is excessive for detected road conditions, implementation of the throttle command may cause slippage of the autonomous vehicle tires such that traction between the vehicle and the road would be delayed, thereby delaying movement of the autonomous vehicle after the throttle command is received. This may delay the turn such that satisfaction of the vehicle proximity condition is prevented. Then the autonomous vehicle computing system may omit this command regime as a candidate for implementation on this basis.

The autonomous vehicle computing system 14 may incorporate a command regime selection capability 213. The computing system 14 may be configured to select a command or command regime for implementation by the vehicle computing system, using the command regime selection capability 213 and based on the most recent previously conducted evaluations of the proposed command regimes received from the teleoperators. In one or more arrangements, in cases where the comparison of the estimated effects of command regime implementation to a particular condition indicates that the estimated effects will conflict with or prevent satisfaction of a condition which should be satisfied in order for the command regime to be implemented, the command regime may be omitted as a candidate for implementation.

For example, as discussed earlier, if implementation of the command regime would involve turning so as to cross a lane in which such an oncoming vehicle is approaching, the vehicle computing system may omit this command regime as a candidate for implementation on this basis.

In another example, if implementation of a command regime would involve turning the vehicle into another lane (for example, a lane just to the right of the left-most lane), the vehicle computing system may omit this command regime as a candidate for implementation on this basis.

In another example, referring again to FIG. 6, if implementation of a command regime would involve making a turn that would not be completed before an oncoming vehicle 199 approached the autonomous vehicle 11 within a distance less than a predetermined distance D1 from the autonomous vehicle 11, the autonomous vehicle computing system 14 may omit this command regime as a candidate for implementation on this basis.

In another example, if implementation of a command regime would involve making a turn that would cross in front of an oncoming vehicle whose speed is not decreasing as it approaches the intersection, the vehicle computing system may omit this command regime as a candidate for implementation on this basis.

In one or more arrangements, the vehicle computing system 14 may be configured to base the selection of a command regime for implementation on one or more other factors, if all proposed command regimes from the teleoperators satisfy the conditions deemed desirable for implementation of the command regime. In one example, if a previous teleoperator command regime relating to the current predetermined driving situation was implemented prior to the determination that more than one teleoperator command regime satisfies all conditions deemed desirable for implementation of a command regime in response to the driving situation, then the computing system may assume that the teleoperator command regimes just evaluated are not the first command regimes received with regard to the predetermined driving situation currently being experienced. The computing system may be configured to determine if one of the latest teleoperator command regimes which satisfies all implementation conditions was received from the teleoperator who generated the last command regime that was implemented. If one of the latest teleoperator command regimes which satisfies all implementation conditions was received from the teleoperator who generated the last command regime that was implemented, the computing system 14 may select for implementation the command regime which was received from the teleoperator who generated the last command regime that was implemented. This aids in providing continuity of vehicle control and helps avoid unnecessary switching of teleoperators.

In another example, if a goal is to complete a vehicle maneuver as quickly as possible while satisfying all of the conditions for implementation of a command regime, the vehicle computing system 14 may select a command regime (if any) which would initiate the maneuver earlier than would other command regimes.

In another example, the vehicle computing system 14 may select for implementation a command regime proposed by an available teleoperator having the highest situational aptitude rating for the type of maneuver being performed.

In another example, if one of the command regimes which satisfies all implementation conditions was received from a teleoperator who generated the last command regime that was implemented to execute the current maneuver, the computing system 14 may be configured to select for implementation the command regime which was received from the teleoperator who generated the last command regime that was implemented. This aids in avoiding change-over between teleoperators as much as possible during execution of the maneuver.

The number and content of the command regime selection conditions may be tailored as needed according to any particular vehicle maneuver or situation, to the indications provided by information available regarding the situation or maneuver, and other pertinent factors. Conditions may be added, removed, or revised from memory as needed or as more data becomes available regarding a given maneuver.

In situations where it is not possible to establish contact with a teleoperation facility to satisfy a need for teleoperator input, where contact with a teleoperation facility is interrupted during a maneuver to the degree that execution of the maneuver becomes impaired or infeasible, and/or where none of the evaluated command regimes satisfy the conditions for implementation, the autonomous vehicle computing system may be configured to implement a "make safe" command regime (i.e., to implement one or more commands to operate the vehicle in a manner intended to remove the vehicle from the paths of surrounding vehicles in traffic, and to stop the vehicle). One or more "make safe" procedures may be stored in a memory of (or accessible by) the vehicle computing system. The "make safe" procedures may consist of various commands which may implemented by the autonomous vehicle computing system 14 to safely remove the autonomous vehicle from the flow of traffic (for example, by self-driving the vehicle to the side of a road or into a readily available parking area) and stopping the vehicle when a safe location is reached. The computing system may be configured to maintain the vehicle in this state until it is determined (by a teleoperator or by the vehicle computing system, for example) to be safe for the autonomous vehicle to enter the road.

If a command regime is selected from the available options, the vehicle may be controlled by the autonomous vehicle computing system 14 to implement the command regime by controlling the primary vehicle systems and other actuatable systems and components so that the selected command regime may be implemented autonomously. If a command regime is not selected, and a command regime suitable for performing the required maneuver can not be formulated by the vehicle computing system, the computing system may implement a "make safe" procedure as previously described.

The computing system may be configured to determine when a vehicle maneuver (such as a left turn or a lane change) is complete. Then, barring the existence of other conditions where input from a teleoperator would be desirable, control of the vehicle may be transferred back to the autonomous vehicle computing system.

Vehicle communications interfaces 16 may be configured to establish and enable continued and uninterrupted interaction between the vehicle 11 and external sensors, other vehicles, other computer systems, various external computing and communications systems and networks (such as communication network 101, a satellite system, a cellular phone/wireless communication system), and also with teleoperation input facility 99 and/or directly with one or more teleoperators (via teleoperation control consoles TC1-TC3). The autonomous vehicle computing system may request teleoperator input via the vehicle communications interfaces 16 when the vehicle is in (or is projected to be in) a predetermined situation in which it is deemed advisable or desirable to request teleoperator input.

Vehicle computing system 14 may operate (via vehicle communications interfaces 16) in a networked environment supporting connections to one or more remote computers, such as other computing systems, terminals and/or mobile devices (e.g., mobile phones, short-range vehicle communication systems, vehicle telematics devices and vehicle-to-vehicle communications systems)(not shown). Any other computing systems or devices in the vehicle and any related terminals or devices in operative communication with vehicle computing system 14 may include devices installed in vehicles, mobile devices that may travel within vehicles, or devices outside of vehicles (such as teleoperator consoles TC1-TC3, for example) that are configured to receive and process vehicle and driving data. Thus, any terminals or devices in communication with the computing system 14 may each include personal computers (e.g., laptop, desktop, or tablet computers), servers (e.g., web servers, database servers, teleoperator manager(s), teleoperator consoles TC1-TC3, etc.), and other terminals or devices.

The communications interfaces 16 may include interfaces enabling communication in a wide area network (WAN), a wireless telecommunications network, and/or any other suitable communications networks (such as or including network 101, for example). The communication network(s) can include wired communication links and/or wireless communication links. The communication network(s) can include any combination of the above networks and/or other types of networks. The communication network(s) can include one or more routers, switches, access points, wireless access points, and/or the like. In one or more arrangements, the communication network(s) can include Vehicle-to-Everything (V2X) technologies (including Vehicle-to-Infrastructure (V2I) and Vehicle-to-Vehicle (V2V) technologies), which can allow for communications between any nearby vehicle(s), and between the vehicle 11 and any nearby roadside communications nodes and/or infrastructure (including vehicle teleoperation input facility 99 and its teleoperator consoles TC1-TC3).

When used in a WAN networking environment, the vehicle computing system 14 may include (or be operatively connected to) a modem or other means for establishing communications over the WAN, such as network (e.g., the Internet). When used in a wireless telecommunications network, the computing system 14 may include (or be operatively connected to) one or more transceivers, digital signal processors, and additional circuitry and software for communicating with wireless computing systems (not shown) via one or more network devices (e.g., base transceiver stations, one or more vehicle teleoperation input facilities such as vehicle teleoperation input facility 99) in the wireless network. These configurations provide various ways of receiving a constant flow of information from (and transmitting a constant flow of information to) various external sources. The communications interfaces 16 may be incorporated into the computing system 14 or may be located spaced apart from the computing system and communicatively coupled to the computing system.

Vehicle navigation module or system 23 may include, for example, a known navigation system receiver (for example, a GPS receiver) configured to receive vehicle location information from a GPS system or other source. However, vehicle navigation system 23 may have any alternative form or configuration suitable for the purposes described herein. Vehicle navigation system 23 may also be configured to operatively communicate with computing system 14 for providing vehicle navigational information for the purposes described herein. Vehicle navigation system 23 may also perform (or assist in performing) any desired route planning for the vehicle, for example, using vehicle occupant destination inputs or teleoperator inputs in a known manner. Computing system 14 may incorporate a suitable navigational system interface (not shown in FIG. 4) if needed to facilitate operative communication with vehicle navigation system 23.

Vehicle navigation system 23 may include any sensor or sensors configured to estimate a geographic location of the vehicle 11. The vehicle navigation system 23 may also be configured to determine or plan a driving route from a given start point (for example, a current location of the vehicle 11 or another designated start location) to a selected destination, using stored and/or available maps, in a manner known in the art. To these ends, the vehicle navigation system 23 may include a one or more transceivers, including a transceiver operable to provide information regarding the position and/or movement of the vehicle 11 with respect to Earth.

Vehicle navigation system 23 may store data such as roadway maps and path information, among other information. Such information may be used by the computing system 14 (either alone or in conjunction with vehicle navigation system 23) in calculating and evaluating various routes that may be autonomously driven by the vehicle 11.

Referring again to FIG. 4, autonomous vehicle 11 may include an array 28 of vehicle sensors designed to monitor various vehicle operational status parameters and environmental conditions external to the vehicle. In a known manner, the vehicle sensors provide data used by the vehicle computing system 14 in formulating and executing suitable control commands in the autonomous vehicle systems 16, 18, 20, 22, 23. For example, data from inertial sensors, wheel speed sensors, road condition sensors, and steering angle sensors may be processed in formulating and executing a command in steering system 18 to turn the vehicle. Examples (not shown) of sensors that may be incorporated into a semi-autonomous or fully autonomous vehicle sensor array include radar and lidar systems, laser scanners, vision/camera systems, GPS systems, various inertial sensors such as gyroscopes and accelerometers, vehicle wheel speed sensors, road condition sensors, suspension height sensors, steering angle sensors, steering torque sensors, brake pressure sensors, accelerator or pedal position sensor, and tire pressure sensors.

The sensor array 28 may include various types of sensors in communication with other vehicle components, for providing feedback on operations of the vehicle. For example, sensors 28 may detect and store data corresponding to the vehicle's location (e.g., GPS coordinates), speed and direction, rates of acceleration or braking, and specific instances of sudden acceleration, braking, and swerving. Sensors 28 also may detect and store data received from the vehicle's internal systems. Sensors 28 may detect and store information relating to external driving conditions, for example, external temperature, rain, snow, light levels, and sun position for driver visibility. For example, external cameras and proximity sensors, radar, lidar and other types of sensors may detect other nearby vehicles, traffic levels, road conditions, traffic obstructions, animals, cyclists, pedestrians, and other conditions that may factor into a driving event data analysis. Sensors 28 also may detect and store data relating to moving violations and the observance of traffic signals and signs by the vehicle. Additional ones of sensors 28 may detect and store data relating to the maintenance of the vehicle, such as the engine status, oil level, engine coolant temperature, odometer reading, the level of fuel in the fuel tank, engine revolutions per minute (RPMs), and/or tire pressure. Vehicle sensors 28 also may include cameras and/or proximity sensors capable of recording additional conditions inside or outside of the vehicle. Certain of vehicle sensors 28 also may determine and collect information regarding the driver's route, and may determine when and how often the vehicle stays in a single lane or stray into other lanes.

The data collected by vehicle sensors 28 may be stored and/or analyzed within the vehicle and/or may be transmitted to one or more external devices. For example, the sensor data may be transmitted via telematics devices to one or more remote computing systems, such as a mobile device, a teleoperator control console, or a teleoperator input facility as previously described. Any data collected by vehicle sensors 28 may also be transmitted to any vehicle system or component requiring or utilizing the data for the purposes described herein.

The sensor system 28 may include a number of sensors configured to sense information about an external environment of the vehicle 11. For example, the sensor system 28 may include a navigation unit such as a Global Positioning System (GPS) and other sensors, for example, an inertial measurement unit (IMU) (not shown), a RADAR unit (not shown), a laser rangefinder/LIDAR unit (not shown), and one or more cameras (not shown) comprising devices configured to capture a plurality of images of the interior of the vehicle and/or an external environment of the vehicle 11 may be used to determine the route, lane position, and other vehicle position/location data. The camera(s) may be still cameras or video cameras. The IMU may incorporate any combination of sensors (e.g., accelerometers and gyroscopes) configured to sense position and orientation changes of the vehicle 11 based on inertial acceleration. For example, the IMU may sense such parameters as vehicle roll rate, yaw rate, pitch rate, longitudinal acceleration, lateral acceleration, and vertical acceleration. The navigation unit may be any sensor configured to estimate a geographic location of the vehicle 11. To this end, the navigation unit may include a one or more transceivers, including a transceiver operable to provide information regarding the position of the vehicle 11 with respect to Earth. The navigation unit may also be configured to determine or plan a driving route from a given start point (for example, a current location of the vehicle) to a selected destination, using stored and/or available maps, in a manner known in the art.

The sensor system 28 may also include sensors configured to monitor internal systems, components, and/or conditions of the vehicle 11 (e.g., an 02 monitor, a fuel gauge, an engine oil temperature). Other sensors are possible as well. One or more of the sensors included in the sensor system 28 may be configured to be actuated separately or collectively in order to modify a position, an orientation, or both, of the one or more sensors.

In a known manner, the vehicle sensors 28 provide data used by the computing system 14 in formulating and executing suitable control commands for the various vehicle systems. For example, data from inertial sensors, wheel speed sensors, road condition sensors, and steering angle sensors may be processed in formulating and executing a command in steering system 18 to turn the vehicle. Vehicle sensors 28 may include any sensors required to support any driver assistance capabilities incorporated into the vehicle 11. In arrangements in which the sensor system 28 includes a plurality of sensors, the sensors can work independently from each other. Alternatively, two or more of the sensors can work in combination with each other. Sensors of the sensor system 28 can be operatively connected to the computing system 14 and/or any other element of the vehicle 11.

Additional ones of sensors 28 may detect and store information relating to external driving conditions, for example, external temperature, rain, snow, light levels, and sun position for driver visibility. For example, external cameras and proximity sensors may detect other nearby vehicles, traffic levels, road conditions, traffic obstructions, animals, cyclists, pedestrians, and other conditions that may factor into a driving event data analysis. Additional ones of sensors 28 may detect and store data relating to the maintenance of the vehicle, such as the engine status, oil level, engine coolant temperature, odometer reading, the level of fuel in the fuel tank and/or the battery or electrical power level in a gas-hybrid vehicle, engine revolutions per minute (RPMs), and/or tire pressure.

Any data collected by vehicle sensors 28 may also be transmitted to any vehicle system or component requiring or utilizing the data for the purposes described herein. For example, the data collected by vehicle sensors 28 may be transmitted to computing system 14, or to one or more specialized system or component controllers (not shown). Additional particular types of sensors may include any other types of sensors needed to perform the functions and operations described herein.

The vehicle 11 may include a suitable signal processing means 38 for situations where a sensor output signal or other signal requires pre-processing prior to use by the computing system 14 or another vehicle system or element, or where a control signal sent from the computing system will require processing prior to use by actuatable sub-systems or sub-system components (for example, components of the steering system or throttle system). The signal processing means may be an analog-to-digital (A/D) converter or digital-to-analog (D/A) converter, for example.

If a controller or computing system requires for processing an integrated or composite signal formed from outputs of multiple individual sensors, the vehicle 11 may incorporate a known sensor fusion means 138 (incorporating, for example, a suitable Kalman filter and/or another element incorporating or embodying a suitable sensor fusion algorithm) in communication with other pertinent vehicle systems, such as computing system 14, sensor system 28, and other vehicle systems. The sensor fusion means 138 may process data received from the various vehicle sensors to generate an integrated or composite signal (formed, for example, from outputs of multiple individual sensors). The sensor fusion means 138 may further provide various assessments based on data from the sensor system 28. In an example embodiment, the assessments may include evaluations of individual objects or features in the environment of the autonomous vehicle 11, evaluation of a particular situation, and evaluation of possible impacts based on the particular situation. Other assessments are also possible. The sensor fusion means 138 may be stored on a memory (such as memory 54) incorporated into or in operative communication with computing system 14, and may be operated by the computing system in a manner known in the art. Also, if a sensor output signal requires pre-processing prior to use by a controller or computing system, a known pre-processing means (not shown) (for example, an A/D converter) may be in communication with other pertinent vehicle systems, such as computing system 14, sensor system 28, and other vehicle systems. Similarly, if operation of any actuatable sub-system components or other vehicle components will require processing of a control signal received from a controller, a known post processing means (for example, an D/A converter) may be provided in communication with other pertinent vehicle systems, such as computing system 14, sensor system 28, and other vehicle systems.

The control system 12 may be configured so that the various controllers, sensors and other elements of the system can communicate with each other using a controller area network (CAN) bus 33 (FIG. 4) or the like. Via the CAN bus and/or other wired or wireless mechanisms, the computing system 14 may transmit messages to various devices in the vehicle and/or receive messages from the various devices, e.g., controllers, actuators, sensors, etc.

Alternatively, any of the elements and/or systems described herein may be directly connected to each other without the use of a bus. Also, connections between the elements and/or systems described herein may be through another physical medium (such as wired connections), or the connections may be wireless connections.

Figure 7:
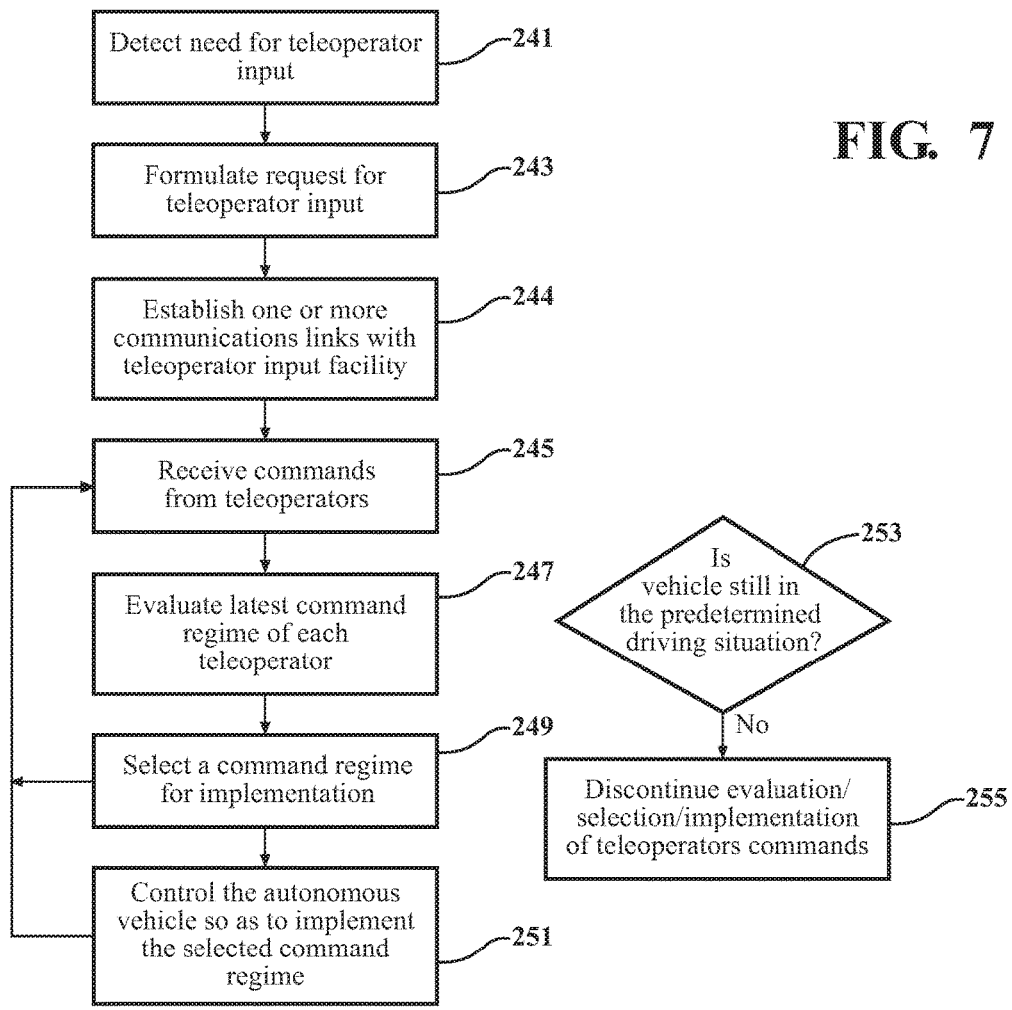
FIG. 7 is a flow diagram showing one example of operation of a vehicle computing system to receive and process command regimes from multiple teleoperators, to determine a command regime to implement as previously described, and to autonomously control the vehicle so as to implement the selected command regime.
Figure 9:
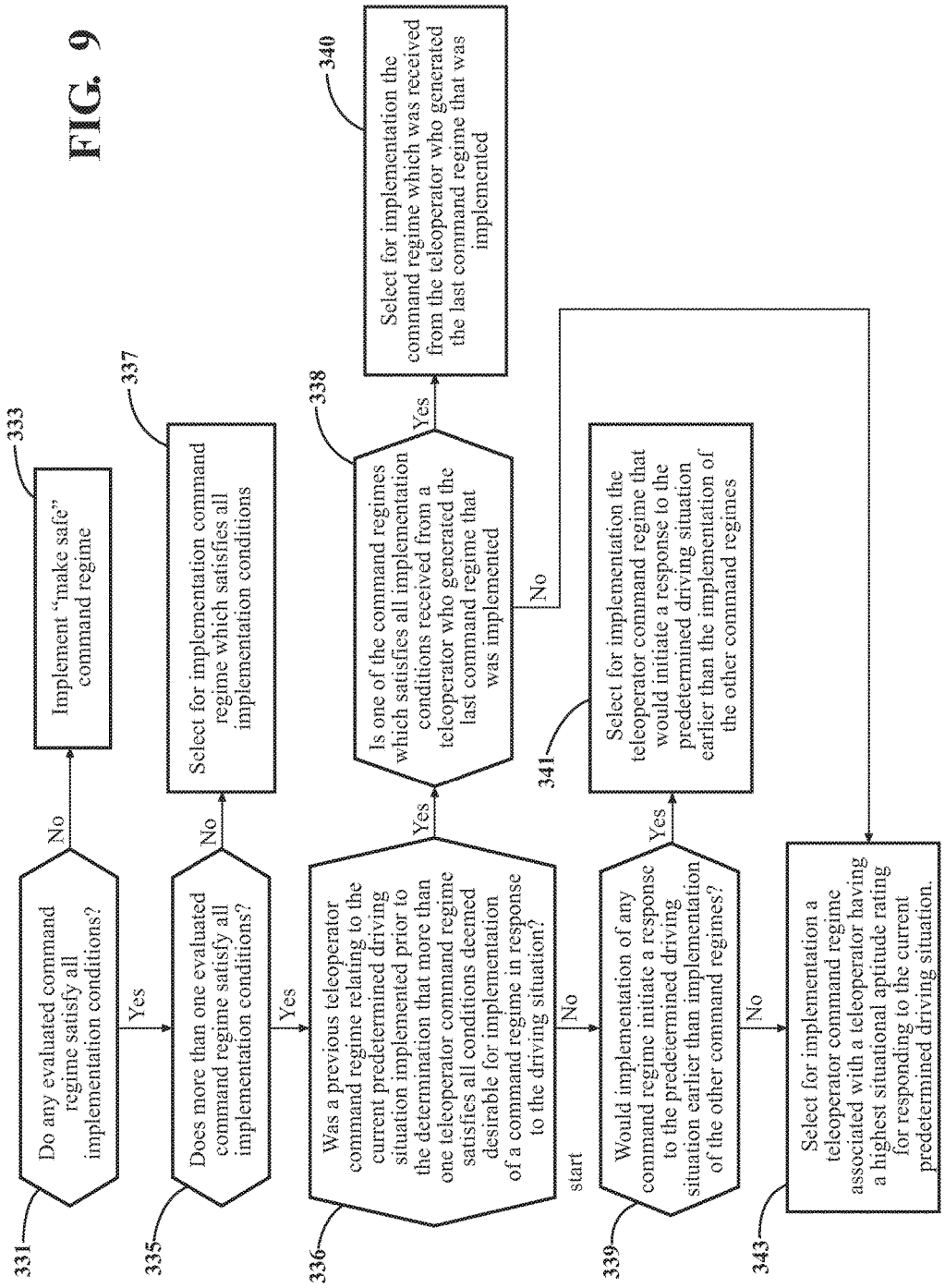
FIG. 9 is a flow diagram illustrating selection of a command regime for implementation based on the most recent evaluation of the command regimes received from the teleoperators, in accordance with one embodiment described herein.

FIGS. 7 and 9 are flow diagrams showing one example of operation of a vehicle computing system to receive and process command regimes from multiple teleoperators, to determine a command regime to implement as previously described, and to autonomously control the vehicle so as to implement the selected command regime. The procedure will be described using the example of a left turn maneuver to be performed by autonomous vehicle 11, in operative communication with teleoperator input facility 99. However, the same basic procedure may be applied to any vehicle situation or maneuver.

Referring to FIG. 7, in block 241, the vehicle computing system 14 may detect, based on interpretation of sensor information or other information, a current or pending predetermined driving situation for which it is advisable for the vehicle to request teleoperator input. The vehicle computing system 14 may then (in block 243) formulate a request for teleoperator input to be transmitted to a vehicle teleoperation input facility (such as vehicle teleoperation input facility 99). The request may include such information as a type of situation that will be encountered or a type of maneuver that will be required, an estimate as to when the teleoperator input may be required, a location where the vehicle will be when the teleoperator input is required, and other pertinent information. The request for teleoperator input may be transmitted to one or more vehicle teleoperation input facilities within communications range of the vehicle.

It is desirable to minimize latency and communications interruptions between the autonomous vehicle 11 and any teleoperators in communication with the vehicle, during the period when teleoperator input will be needed. Thus, in one or more arrangements, a teleoperator manager at a first vehicle teleoperation input facility which receives an initial request for teleoperator input may transfer the request to another vehicle teleoperation input facility if, for example, the other vehicle teleoperation input facility is closer to the location where the teleoperator input is to be needed, or the other teleoperation facility is deemed to enable provision of a higher communications bandwidth or more reliable communications link with the autonomous vehicle. In one or more arrangements, a teleoperator manager at a first vehicle teleoperation input facility which receives an initial request for teleoperator input may transfer the request to another vehicle teleoperation input facility if, for example, the other facility has access to a teleoperator with a higher situational aptitude for the particular maneuver that the autonomous vehicle will need to perform.

Following receipt of a request for teleoperation input, a teleoperator manager 99a at the vehicle teleoperation input facility 99 that will provide the teleoperator input may determine which teleoperators will be assigned to provide input to the autonomous vehicle. In the example described, at least two teleoperators will be assigned to provide input in the form of proposed commands or command regimes. However, any desired number of teleoperators may be tasked with providing input to the vehicle.

In block 244, a teleoperator manager at the vehicle teleoperation input facility 99 that will provide the teleoperator input and the autonomous vehicle 11 may establish one or more communications links via the communications network 101. The communications links may be configured to provide uninterrupted communications between the autonomous vehicle 11 and the vehicle teleoperation input facility control consoles attended by the teleoperators who will provide teleoperator input to the vehicle. In one or more arrangements, the communications links may be established so as to allow sufficient time for all of the teleoperators to achieve situational awareness prior to an actual need for teleoperator input. The autonomous vehicle computing system 14 may also be configured to transmit a special signal to the teleoperator control consoles when an actual need for the teleoperator input arises, in the event of an emergency or circumstances preventing advance notice of a need for teleoperator input.

In block 245, the latest teleoperator commands may be received from a teleoperator into an associated command buffer, and the command regime associated with the teleoperated may be updated in the buffer. This updating may be done on a continuous basis as new and revised commands are received from the teleoperator. This step may be performed simultaneously for all teleoperators in operative communication with the autonomous vehicle 11.

In parallel with continuously receiving commands from the teleoperators, the computing system may (in block 253) continuously monitor for conditions indicating that performance of a required maneuver has been completed or that the vehicle is otherwise no longer in the predetermined driving situation, so that full vehicle control may be transferred back to the autonomous vehicle computing system. If the maneuver has been completed, the computing system may (in block 255) discontinue any further evaluation, selection, and implementation steps.

In block 247, the autonomous vehicle computing system may evaluate the latest command regime received from each teleoperator as stored in the associated command buffer, in the manner previously described or in a similar manner. For example, the computing system 14 may estimate the effects on the autonomous vehicle 11 of implementing a command and/or command regime.

The command regime evaluated for each teleoperator may be the command regime residing in the buffer allocated for receiving commands from that teleoperator, at the time the command regime evaluation is commenced. Thus, each time a command regime evaluation process is started, the computing system 14 may extract and simultaneously process the command regimes residing in the associated buffers at that time. Stated another way, each time a command regime evaluation process is started, the command regimes residing in the associated buffers at that time may be taken as the most-recently received command regimes for purposes of conducting the evaluation.

The computing system 14 may then compare the estimated effects of implementing a proposed command or command regime to one or more implementation conditions which need to be satisfied in order for the command or command regime to be implemented. Using the results of the comparisons, the computing system may determine if any conflicts exist between the estimated effects and the implementation conditions.

In block 249, the computing system may select a command regime for implementation by the computing system, in the manner previously described or in a similar manner. In one or more arrangements, the selected command regime may one which satisfies all of the implementation conditions in effect for the particular maneuver. Also, as discussed previously, the vehicle computing system 14 may be configured to base the selection of a command regime for implementation on one or more other factors, if all proposed command regimes satisfy the command regime selection conditions. for example, the vehicle computing system 14 may select a command regime (if any) which would begin the maneuver earlier than would other command regimes, or the vehicle computing system 14 may select for implementation a command regime proposed by an available teleoperator having the highest situational aptitude rating for the type of maneuver being performed.

FIG. 9 is a flow diagram illustrating selection of a command regime for implementation based on the most recent evaluation of the command regimes received from the teleoperators, in accordance with one embodiment described herein.

In block 331, the computing system may determine if any of the evaluated command regimes satisfy all of the implementation conditions. If none of the evaluated command regimes satisfy all of the implementation conditions, the computing system may (in block 333) execute "make safe" procedures as previously described. However, if any of the evaluated command regimes satisfy all of the implementation conditions, the computing system may (in block 335) determine if more than one evaluated command regime satisfies all implementation conditions.

If more than one evaluated command regime does not satisfy all implementation conditions, the computing system may (in block 337) select for implementation the command regime which satisfies all implementation conditions. However, if more than one evaluated command regime satisfies all implementation conditions, the computing system may (in block 336) determine if more than one teleoperator command regime satisfies all conditions deemed desirable for implementation of a command regime in response to the driving situation, determining if a previous teleoperator command regime relating to the predetermined driving situation was implemented prior to the determination that more than one teleoperator command regime satisfies all conditions deemed desirable for implementation of a command regime in response to the driving situation.

If a previous teleoperator command regime relating to the predetermined driving situation was implemented, the computing system 14 may assume that the most recently evaluated teleoperator command regimes are not the first command regimes evaluated with regard to the maneuver being executed. Then, the computing system may (in block 338) determine if one of the command regimes which satisfies all implementation conditions was received from a teleoperator who generated the last command regime that was implemented.

If one of the command regimes which satisfies all implementation conditions was not received from a teleoperator who generated the last command regime that was implemented, the computing system 14 may (in block 343) select for implementation the command regime associated with the teleoperator having the highest situational aptitude rating for the type of maneuver being performed. If one of the command regimes which satisfies all implementation conditions was received from a teleoperator who generated the last command regime that was implemented, the computing system may (in block 340) select for implementation the command regime which was received from the teleoperator who generated the last command regime that was implemented. This avoids the need to switch teleoperators whenever possible, thereby promoting continuity of command and timeliness of execution of the commands.

Referring again to block 336, if a previous teleoperator command regime relating to the current predetermined driving situation was not implemented prior to the determination that more than one teleoperator command regime satisfies all conditions deemed desirable for implementation of a command regime in response to the driving situation, the computing system 14 may assume that the most recently evaluated teleoperator command regimes are the first command regimes evaluated with regard to the current predetermined driving situation. Then the computing system may (in block 339) determine if implementation of any command regime which satisfies all conditions deemed desirable for implementation would initiate a response to the predetermined driving situation earlier than implementation of the other command regimes. If implementation of any command regime which satisfies all implementation conditions would initiate a response to the predetermined driving situation earlier than implementation of the other command regimes, the computing system may (in block 341) select for implementation the command regime that would initiate a response earlier than the other command regimes. However, if no command regime would initiate the required maneuver sooner than the other command regimes, the computing system may (in block 343) select for implementation the command regime select for implementation the teleoperator command regime associated with a teleoperator having the highest situational aptitude rating for the current predetermined driving situation. The evaluation, selection, and implementation of received command regimes inputs may proceed in this manner until the maneuver is completed.

Teleoperator commands from each teleoperator may be continuously or constantly received from the teleoperator control consoles. A cycle of evaluation, selection, and implementation may be continuously performed on received commands. A certain amount of time will be required to evaluate, select, and implement commands. Processors may evaluate the command regimes and select a command regime. Then the selected command regime may be implemented by the computing system.

Figure 10:
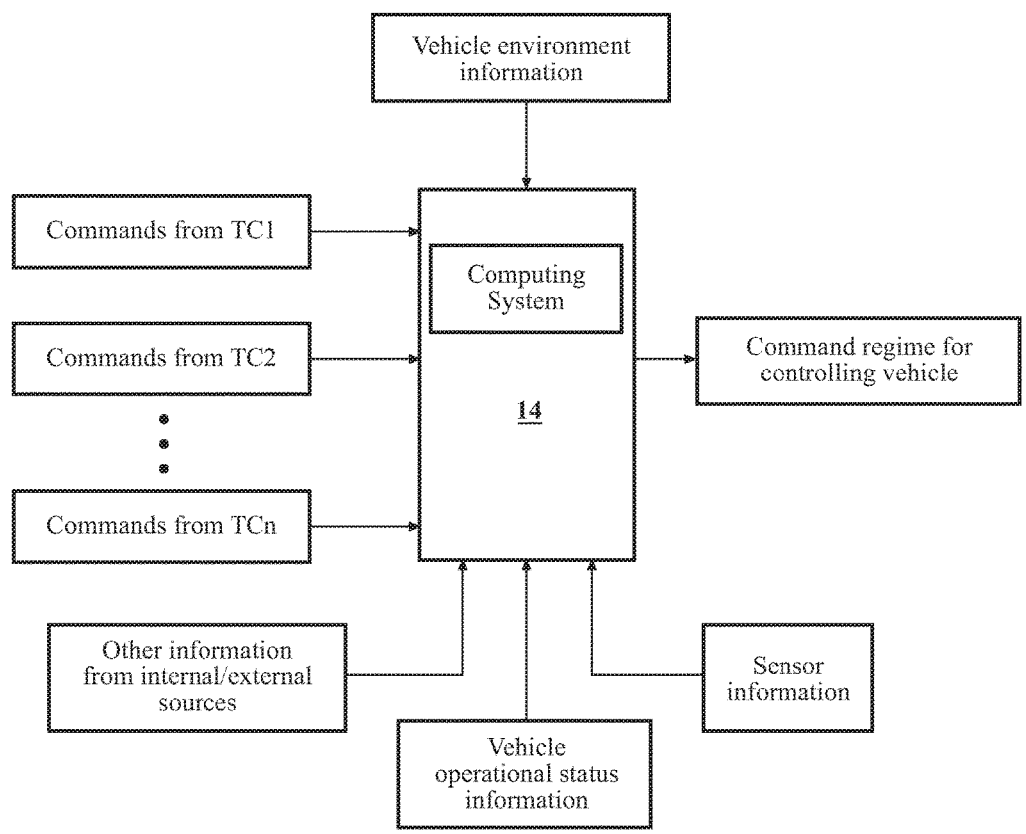
FIG. 10 is a block schematic diagram showing various inputs that may be used by the autonomous vehicle computing system to determine a command regime that will be used to control the autonomous vehicle

FIG. 10 is a block schematic diagram showing various inputs that may be used by computing system 14 to determine a command regime that will be used to control the autonomous vehicle 11. As described herein, in cases where command regimes received from teleoperators are used by the computing system to control the vehicle, the computing system may evaluate all commands received from teleoperators using the other inputs (such as vehicle operational status information, sensors information, vehicle environment information, and any other pertinent information) and any pertinent implementation conditions. As a consequence of continuous evaluation of updated command regimes received from multiple teleoperators, the computing system may select and implement command regimes received from multiple teleoperators during the execution of a single maneuver or in response to a single predetermined driving situation.

Figure 8:
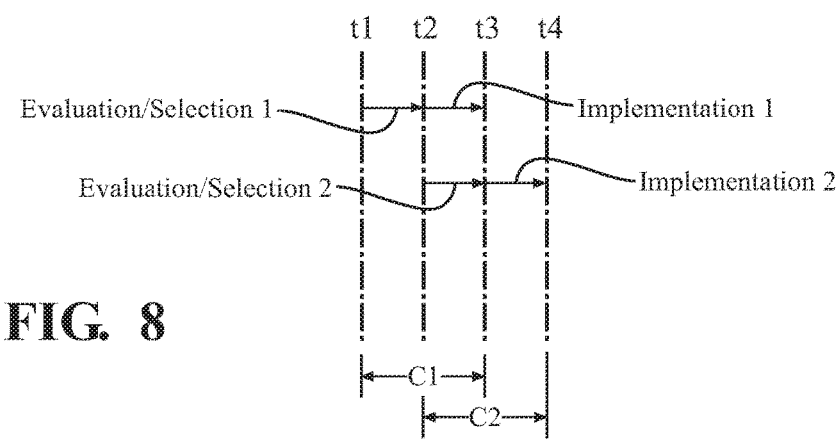
FIG. 8 is a schematic view of an example of possible operation of execution of an evaluation/selection/implementation cycle for teleoperator command regimes in the command buffers.

FIG. 8 shows an example of possible operation of the evaluation/selection/implementation cycle for teleoperator command regimes in the command buffers. At t1, an evaluation/selection portion (evaluation/selection 1) of the cycle may begin for a first cycle C1. The evaluation/selection portion of the cycle may end at t2, at which time the implementation portion (implementation 1) of the cycle C1 begins. Also, at time t2, the evaluation/selection portion (evaluation/selection 2) of a second cycle C2 may begin. This evaluation/selection portion of the second cycle may be performed while the vehicle actuatable systems and elements are being operated to implement the command regime selected in the first cycle C1. In one or more arrangements, the computing system and processors may be configured to complete an evaluation/selection portion of the second cycle C2 as soon as possible (for example, by or before a time when the command regime selected in the first cycle C1 has been completely implemented, so that an updated command regime has been selected for implementation as soon as possible. This process promotes continuity and a smooth flow of command implementation.

If the evaluation/selection portion of the cycle may require more time than it may take to implement a selected command regime, another processor (not shown) may be tasked with performing alternate evaluation/selection portions of the cycle. That is, two processors perform evaluation/selection portions of the evaluation/selection/implementation cycles in alternating fashion, to split the computational load. Thus, for example, a first processor may perform an evaluation/selection portion of a first cycle, and a second processor may perform an evaluation/selection portion of a second cycle following the first cycle. The first processor may then perform an evaluation/selection portion of a third cycle following the second cycle. Then the second processor may then perform an evaluation/selection portion of a fourth cycle following the third cycle.

All of the teleoperators in operative communication with the autonomous vehicle may follow the progress of the vehicle and maintain situational awareness via their associated control consoles. The teleoperator(s) whose command regimes are not currently being implemented by the vehicle computing system may continue to enter commands responsive to the predetermined driving situation as perceived at the associated control consoles of the teleoperator(s). Thus, a continuous stream of commands may be generated at each control console by actuation of the controls by the teleoperators. The statuses of the controls (such a steering wheel angle, for example) for all control consoles may be continuously transmitted to the autonomous vehicle. Any changes in the commands and control statuses may be reflected in the command regimes stored in the command buffers in the autonomous vehicle. In this manner, a teleoperator whose command regimes are not currently being implemented by the vehicle computing system may be prepared for a situation where the vehicle computing system will switch to his or her command regime (as reflected in the vehicle command buffers) for implementation, if implementation of a previous command regime is no longer feasible.

At the end of each evaluation/selection cycle, the current command regime stored in the command buffer may be processed during the following evaluation/selection cycle. Thus, it is possible that an initially selected command regime (and revisions thereof) received from a single teleoperator may be employed to perform the entire maneuver, if the command regime continues to meet the conditions for implementation. Alternatively, if an initially-selected command regime changes such that it no longer meets the required conditions while commands from another teleoperator do satisfy the conditions, the computing system may shift to implement the command regime from the other teleoperator. The computing system 14 may be configured to shift to implementation of another acceptable command regime if a command regime currently being implemented no longer satisfies the implementation conditions, or if the communication link between the vehicle and the teleoperator supplying the current command regime fails or develops problems, for example. In this manner, an optimum overall command regime for the autonomous vehicle may be maintained during performance of the maneuver. Command buffers may be cleared after it is determined that the vehicle is not longer in the predetermined driving situation.

In one or more arrangements, due to the close relationship between a throttle command, an associated steering command, and a braking command which may follow the steering and throttle commands, and in cases where a vehicle maneuver is not yet complete, the computing system may be configured to implement a braking command received from the same teleoperator as any immediately preceding throttle and steering commands. The ability to elicit input from multiple teleoperators may be particularly useful in cases where the vehicle is traveling along a planned route (for example, as determined by a navigation system in operative communication with the vehicle computing system). This enables suitable communications links to be established prior to the actual need for teleoperator input, which facilitates teleoperator situational awareness.

As will be appreciated by one skilled in the pertinent the art upon reading the preceding disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media for executing the functions described herein. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

It should be understood that the preceding is merely a detailed description of various embodiments of this invention and that numerous changes to the disclosed embodiments can be made in accordance with the disclosure herein without departing from the spirit or scope of the invention. Thus, the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computing system for an autonomous vehicle, the computing system comprising one or more processors for controlling operation of the computing system, and a memory for storing data and program instructions usable by the one or more processors, wherein the one or more processors are configured to execute instructions stored in the memory to:
   evaluate a first command regime received from a first teleoperator responsive to a predetermined driving situation of the autonomous vehicle;
   evaluate a second command regime received from a second teleoperator responsive to the predetermined driving situation;
   responsive to evaluation of the first and second command regimes, select a command regime for implementation by the computing system in response to the predetermined driving situation; and
   control the autonomous vehicle to implement the selected command regime.

2. The computing system of claim 1 wherein the selected command regime is one of the first command regime received from the first teleoperator and the second command regime received from the second teleoperator.

3. The computing system of claim 1 wherein the selected command regime is a "make safe" command regime.

4. The computing system of claim 1 wherein the one or more processors are configured to execute instructions stored in the memory to determine when the autonomous vehicle is in or approaching the predetermined driving situation of the autonomous vehicle.

5. The computing system of claim 1 wherein the first command regime and the second command regime are directed to providing commands to the autonomous vehicle computing system directing the autonomous vehicle computing system to execute at least a portion of a vehicle maneuver in response to the predetermined driving situation of the autonomous vehicle.

6. The computing system of claim 5 wherein the one or more processors are configured to execute instructions stored in the memory to detect when the autonomous vehicle is no longer in predetermined driving situation.

7. The computing system of claim 1 wherein the one or more processors are configured to execute instructions stored in the memory to:
   determine an operational status of the autonomous vehicle;
   determine a vehicle environment of the autonomous vehicle; and
   estimate, using the operational status of the autonomous vehicle and the vehicle environment of the autonomous vehicle, effects of executing the first command regime and the second command regime.

8. The computing system of claim 7 wherein the one or more processors are configured to execute instructions stored in the memory to compare estimated effects of executing each of the first command regime and the second command regime with conditions deemed desirable for implementation of a teleoperator command regime in response to the predetermined driving situation, to determine if implementation of either of the first command regime and the second command regime conflicts with any of the conditions.

9. A method of controlling an autonomous vehicle responsive to a predetermined driving situation, the method comprising steps of:
   a) receiving, from each teleoperator of a plurality of teleoperators, an associated teleoperator command regime relating to the predetermined driving situation;

b) evaluating the teleoperator command regime received from each teleoperator of the plurality of teleoperators;

c) responsive to evaluation of the teleoperator command regime received from each teleoperator of the plurality of teleoperators, selecting a command regime for implementation for responding to the predetermined driving situation;

d) controlling the autonomous vehicle so as to implement the selected command regime; and iteratively repeating steps (a)-(d) until the autonomous vehicle is not in the predetermined driving situation.

10. The method of claim 9 further comprising steps of, prior to the step of receiving a teleoperator command regime from each teleoperator relating to the predetermined driving situation:

detecting the predetermined driving situation; and responsive to detection of the predetermined driving situation, requesting teleoperator input relating to the predetermined driving situation.

11. The method of claim 9 wherein the step of evaluating the teleoperator command regime received from each teleoperator of the plurality of teleoperators comprises steps of:

determining an operational status of the autonomous vehicle;

determining a vehicle environment of the autonomous vehicle;

estimating, using the operational status of the autonomous vehicle and the vehicle environment of the autonomous vehicle, effects of executing the teleoperator command regime received from each teleoperator; and comparing estimated effects of implementing the teleoperator command regime received from each teleoperator with conditions relating to the predetermined driving situation and deemed desirable for implementation of a command regime in response to the predetermined driving situation, to determine if implementation of any of the teleoperator command regimes conflict with any of the conditions.

12. The method of claim 9 wherein the step of selecting a command regime for implementation for responding to the predetermined driving situation comprises steps of:

determining if any teleoperator command regime received from a teleoperator of the plurality of teleoperators satisfies all conditions deemed desirable for implementation of a command regime in response to the predetermined driving situation;

if no teleoperator command regime satisfies all conditions deemed desirable for implementation of a command regime in response to the predetermined driving situation, implementing a "make safe" command regime;

if any teleoperator command regime satisfies all conditions deemed desirable for implementation of a command regime in response to the predetermined driving situation, determining if more than one of the teleoperator command regimes received from the teleoperators of the plurality of teleoperators satisfies all conditions for implementation; and if only one teleoperator command regime of the teleoperator command regimes received from the teleoperators of the plurality of teleoperators satisfies all conditions deemed desirable for implementation of a command regime in response to the predetermined driving situation, selecting for implementation the teleoperator command regime which satisfies all conditions deemed desirable for implementation of a command regime in response to the predetermined driving situation.

13. The method of claim 12 wherein the step of selecting a command regime for implementation for responding to the predetermined driving situation further comprises steps of:

if more than one teleoperator command regime satisfies all conditions deemed desirable for implementation of a command regime in response to the driving situation, determining if a previous teleoperator command regime relating to the predetermined driving situation was implemented prior to determining that more than one teleoperator command regime satisfies all conditions deemed desirable for implementation of a command regime in response to the driving situation;

if a previous teleoperator command regime relating to the predetermined driving situation was implemented prior to determining that more than one teleoperator command regime satisfies all conditions deemed desirable for implementation of a command regime in response to the driving situation, determining if one of the teleoperator command regimes which satisfies all conditions deemed desirable for implementation was received from a teleoperator who generated the previous teleoperator command regime that was implemented; and if one of the teleoperator command regimes which satisfies all conditions deemed desirable for implementation was received from a teleoperator who generated the last command regime that was implemented, selecting for implementation the teleoperator command regime which was received from the teleoperator who generated the previous teleoperator command regime that was implemented.

14. The method of claim 13 wherein the step of selecting a command regime for implementation for responding to the predetermined driving situation further comprises step of, if none of the command regimes which satisfy all conditions deemed desirable for implementation was received from a teleoperator who generated the previous teleoperator command regime that was implemented, selecting for implementation a teleoperator command regime associated with a teleoperator having a highest situational aptitude rating for responding to the predetermined driving situation.

15. The method of claim 14 wherein the step of selecting a command regime for implementation for responding to the predetermined driving situation further comprises steps of:

if a previous teleoperator command regime relating to the predetermined driving situation was not implemented prior to determining that more than one teleoperator command regime satisfies all conditions deemed desirable for implementation of a command regime in response to the predetermined driving situation, determining if implementation of any teleoperator command regime would initiate a response to the predetermined driving situation earlier than implementation of any other command regimes; and if implementation of any teleoperator command regime would initiate a response to the predetermined driving situation earlier than implementation of the other command regimes, selecting for implementation the teleoperator command regime that would initiate a response to the predetermined driving situation earlier than implementation of the other command regimes.

16. The method of claim 15 wherein the step of selecting a command regime for implementation for responding to the predetermined driving situation further comprises the step of, if implementation of any teleoperator command regime would not initiate a response to the predetermined driving situation earlier than implementation of the other command regimes, selecting for implementation a teleoperator command regime associated with a teleoperator having a highest situational aptitude rating for the predetermined driving situation.

* * * * *